United States Patent [19]
Levine

[11] Patent Number: 6,105,033
[45] Date of Patent: Aug. 15, 2000

[54] METHOD AND APPARATUS FOR DETECTING AND REMOVING OBSOLETE CACHE ENTRIES FOR ENHANCING CACHE SYSTEM OPERATION

[75] Inventor: Donald P. Levine, Glendale, Ariz.

[73] Assignee: Bull HN Information Systems Inc., Billerica, Mass.

[21] Appl. No.: 09/109,429

[22] Filed: Jul. 2, 1998

Related U.S. Application Data

[63] Continuation-in-part of application No. 08/999,248, Dec. 29, 1997.

[51] Int. Cl.[7] .................................................... G06F 17/30
[52] U.S. Cl. ............................................ 707/101; 707/203
[58] Field of Search ..................... 714/21, 49; 707/101, 707/203; 711/119

[56] References Cited

U.S. PATENT DOCUMENTS

| | | | |
|---|---|---|---|
| 4,791,558 | 12/1988 | Chaitin et al. | 395/704 |
| 4,858,114 | 8/1989 | Heath et al. | 395/527 |
| 5,794,250 | 8/1998 | Carino, Jr. et al. | 707/104 |

OTHER PUBLICATIONS

Delis et al., "Database Support for Software Engineering Environments", IEEE, pp. 311–316, Aug. 1992.

*Primary Examiner*—Thomas G. Black
*Assistant Examiner*—John C. Loomis
*Attorney, Agent, or Firm*—Faith F. Driscoll; John S. Solakian

[57] ABSTRACT

A host system includes a multicache system configured within a host system's memory which has a plurality of local and central cache systems used for storing information being utilized by a plurality of processes running on the system. The central cache system includes an obsolete code management (OCM) component that operates to detect and remove obsolete entries stored within the central cache system. The OCM component operates to remove obsolete code from all the caches when events cause such obsolescence, e.g., data definition language (DDL) statements are executed. In certain situations, by being able to perform such operations during DDL statement processing, the OCM component further enhances overall system operation.

18 Claims, 20 Drawing Sheets

METHOD AND APPARATUS FOR DETECTING AND REMOVING OBSOLETE CACHE ENTRIES FOR ENHANCING CACHE SYSTEM OPERATION

This application is a continuation-in-part of copending patent application entitled "A Method and Apparatus For Improving the Performance of A Database Management System Through A Central Cache Mechanism", invented by Donald P. Levine and David A. Egolf, bearing Ser. No. 08/999,248 filed on Dec. 29, 1997, which is assigned to the same assignee as this patent application.

BACKGROUND OF THE INVENTION

1. Field of Use

The present invention relates to data processing systems and more particularly to database management systems.

2. Prior Art

Typically, today's enterprise or legacy systems store large quantities of data in database systems accessed by database management system (DBMS) software. In such database systems, data is logically organized into relations or tables wherein each relation can be viewed as a table where each row is a tuple and each column is a component of the relation designating an attribute. It has become quite common to use relational database management systems (RDMS) for enabling users to enter queries into the database in order to obtain or extract requested data. To extract desired data, the user enters a query derived from a database query language into the RDMS.

One well known query language is Sequel Query Language (SQL). The query language provides a set of commands for storing, retrieving and deleting data. Such language for relational database management systems does not require users to specify the manner in which data needs to be accessed. Generally, a query optimizer component is included in the database management system to select the manner in which queries will be processed. That is, the query optimizer component analyzes how best to conduct the user's query of the database in terms of optimum speed in accessing the requested data (i.e., provides an access plan for executing an SQL statement including the type of access to each table, order of access, whether any sorts or joins are performed and related information).

As known in the art, to conserve space in the database, it becomes desirable that the stored data values not be unnecessarily duplicated. Therefore, in a relational database, instead of having one very large table to hold duplicate data values, the user generally creates several smaller tables that contain unique data values that are related to each other through common attributes. A user can retrieve data for a given set of criteria by "joining" the smaller tables to represent the large table. Data is extracted from the system using a query command that locates all rows in a table or tables that meet specified criteria. In such systems, one of the most expensive operations to conduct in terms of time and resources is the "join operation" which joins together two or more entire relations which can be fairly large. When multiple joins are present in a user generated query, as is the typical case, the cost of processing the query increases dramatically. Thus, the time expended in developing, optimizing and processing complex queries can be exceedingly costly in terms of time and resources. This is particularly true as more and more complex data types.

To improve system performance in executing programs that use SQL statements to access such databases, one approach has been the introduction of an SQL cache which makes it possible to reuse the results of having processed certain types of complex query statements. This involves associating each process (i.e., each program in execution) with a local cache which is used to save the code generated for each SQL statement by such process.

The above approach has allowed the system in certain cases to bypass the step of code generation when the system encounters an identical SQL statement during the execution of a particular process. Since programs that access such database files repeatedly execute identical SQL statements, the use of an SQL cache with each process has been found to significantly improve performance. An example of a system that makes use of an SQL cache is the INTEREL product developed and marketed by Bull HN Information Systems Inc. For information concerning this product, reference may be made to the publication entitled, "Database Products INTEREL Reference Manual INTEREL Performance Guidelines, Copyright, 1996 by Bull HN Information Systems Inc., Order No. LZ93 Rev01B.

To improve performance of the above type of system, a multicache system organization was developed which enables a plurality of processes to utilize code generated in response to statements processed by each of the other processes which are stored in a central cache system. This substantially more efficient method of improving cache performance through the use of a central cache system is disclosed in the parent patent application entitled, "A Method and Apparatus For Improving the Performance of A Database Management System Through A Central Cache Mechanism".

While the above approach provides improved performance, it was noted that changes in the states of the relational database objects could have a considerable performance impact on overall system operation. That is, changes in such objects can easily render various associated cache entries obsolete. The use of obsolete entries can produce incorrect results from database entries, create software-triggered hardware faults or other exception conditions or even cause corruption in databases.

Hence the user is faced with several options which include (1) manually clearing such caches, (2) avoiding the use of the data definition language (DDL) facilities used in making such changes when such a cache is active or (3) run the risk of using obsolete entries. The first option is quite time consuming in terms of system overhead particularly in the case of large complex databases while the second option limits the user in terms of when such changes or updates can be made to the database. The last option could markedly reduce the integrity of the database.

Accordingly, it is a primary object of the present invention to provide a more efficient way of removing cache entries that have been made obsolete by changes made to database objects.

It is a more specific object of the present invention to provide a mechanism for efficiently detecting and removing obsolete cache entries.

SUMMARY OF THE INVENTION

The above objects are achieved in a preferred embodiment of the obsolete code management (OCM) component of the present invention which operates to detect and remove obsolete entries stored within an SQL multicache system residing in the memory of a host system. The multicache system is organized to include one local cache memory per process accessing host system databases and at least one central cache memory shareable among the processes. The multicache cache system of the preferred embodiment is described in detail in the above cited parent patent application entitled "A Method and Apparatus For Improving the Performance of A Database Management System Through A Central Cache Mechanism".

To achieve maximum performance, it is noted that generated code that resides in the central cache system is very specific to both the SQL statement that it executes as well as the state of the models, tables and indexes that it accesses. This "state" defined by the code includes the columns that exist in a table, the tables that exist in a model, the indexes that are used to access the model or the tables therein. This state does not include the values that represent the data that is stored in the database relational tables.

The SQL Cache System enforces the matching of the SQL statement being executed along with other factors (e.g. such as owner and model name, cursor name, number and type of host variables, and executing user) with the associated generated code. Different statements will match different generated code segments in the cache. However, if the state of the models, tables, indexes, or permissions change, it may not be valid to use the generated code that would have otherwise matched in the cache.

For example, code may be generated for a particular SQL statement that accesses a particular table that contains three columns. If, during the life of this code segment's residence in the SQL cache, a column of the table is deleted (or "dropped"), leaving two columns, execution of the code that was generated when the table had three columns may cause undesirable results. These results may manifest themselves as incorrect results of queries, hardware faults, or even database corruption. Example of other database changes that can cause generated code to become invalid, or "obsolete", include the dropping or addition of an index to a table, the dropping of a table from a model, the addition of a column to a table, and the alteration of access permissions. The types of statements that result in such database changes are often referred to Data Definition Language statements, or DDL.

With just a local SQL Cache, that is, within a system where there is a separate SQL cache for each executing process, the present invention avoids this problem by assuring that such database changes are performed when application processes are not executing. This is because when a process terminates, the generated code in the local cache is discarded. With a central SQL cache that is shared among multiple processes and can well outlive the span of executing of a process, such assurances are much more difficult. With a central SQL cache that holds many generated code segments, explicitly clearing or even deleting the central cache will cause the discarding of code segments that may not even be affected by the database changes. The present invention remedies these problems by the addition of an Obsolete Code Manager (OCM) system to the Central SQL Cache System.

With an OCM system, code that is made obsolete by database changes, such as those mentioned above, is automatically deleted. However, only the code that is effected by the database changes is deleted. Note that even with an OCM system in place, it is still not considered good practice to make various database changes while an application is in execution. Such changes may even force the application to be changed. For example, if an application contains a query that accesses three columns of a table and one of the columns accessed is dropped, the application has to be changed accordingly. However, other changes do not require the application to be changed. For example, if an index is dropped, the application may not need to be modified even though the code generated when the index existed is no longer valid. For another example, the access permissions to a table may be able to be modified without application modification. In these types of cases, the existence of an OCM system can assure that the appropriate code is deleted, while allowing non-affected code to remain in the central cache.

In a system in which there are multiple central SQL caches active, the OCM system will remove obsolete code from all the caches when events, i.e., data definition language (DDL) statements are executed that cause such obsolescence.

The Obsolete Code Manager system contains a set of component structures that allows the efficient removal of entries in a central SQL cache if given the owner, model, and table that are affected by a DDL action that results in one or more generated code entries in the cache to become obsolete. When called to delete obsolete code, the OCM system utilizes its component structures to quickly locate the affected cache entries.

In the preferred embodiment, the component structures of the OCM system include of a set of entries, each representing a particular combination of owner, model, and table names. The owner and model names are used to qualify a particular relational table name. These entries, representing the owner, model, and table names are referred to herein as TMO entries. At any particular time, there is one and only one TMO entry for each unique table that is referenced by all the code segments in the central SQL cache. If more than one code segment in the central SQL cache references a particular table, there is only one TMO entry for that table in the OCM system. Furthermore, if there are code segments in the central SQL cache that reference more than one table, such as a code segment that contains the machine instructions to execute a SQL "join", there will be a TMO entry for each table referenced.

During the processing of DDL statements that affect the validity of code in the central cache, the OCM system is called. The OCM system then uses its component structures to locate any code fragment that references the table(s) or model affected by the DDL statement and deletes the corresponding entries from the central cache system.

The above objects and advantages of the present invention will be better understood from the following description when taken in conjunction with the accompanying drawings.

BRIEF DESCRIPTION OF THE DRAWINGS

FIG. 6b illustrates the linkages connecting code segments within a table chain of FIG. 6a.

DESCRIPTION OF THE PREFERRED EMBODIMENT

FIG. 1

Figure 1:
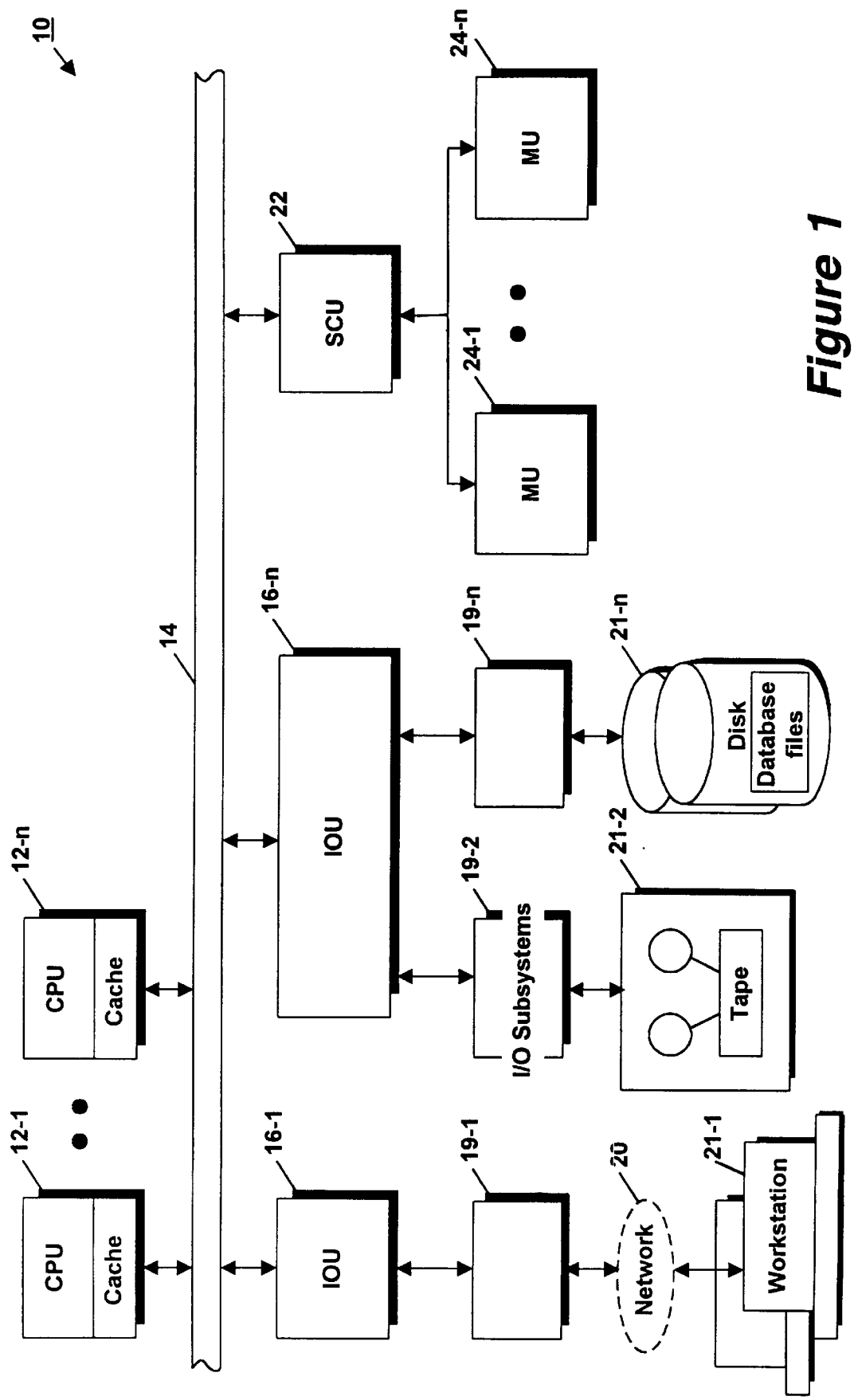
FIG. 1 is an overall block diagram of a data processing system that utilizes the teachings of the present invention.

FIG. 1 is a block diagram of a conventional data processing system 10 that utilizes the OCM system of the present invention. As shown, the system 10 includes a plurality of processing units 12-1 through 12-n which connect to a system bus 14 through their individual physical caches in common with a number of input/output units (IOUs) 16-1 through 16-n and a system control unit (SCU) 22. As shown, each IOU couples to a particular I/O subsystem (i.e. 19-1 through 19-n) which in turn connect to anyone of a number of different types of devices both local and remote such as workstations 21-1 via a network 20, tape mass storage units 21-2, or disk mass storage units 21-n as indicated.

The SCU 22 connects to a number of memory units (MUs) 24-1 through 24-n. For the purpose of the present invention, system 10 may be considered convention in design and may for example utilize a mainframe computer system such as the DPS9000 manufactured by Bull HN Information Systems Inc. which operates under the control of the GCOS8 operating system. In this system configuration, users may wish to access the files of a large relational database stored on disk storage 21-n via the network 20 by entering SQL database queries via their workstation keyboard and/or via other input devices (e.g. mouse). The system 10 upon receiving the SQL query operates to initiate a search of the database files to obtain the data requested by the user. In system 10, all user SQL queries are presented to a relational application manager which forms part of a relational database management system such as INTEREL software which runs under the GCOS8 operating system. This software is transferred to the system 10 via tape and installed via a tape drive 21-2 (or via other suitable magnetic media and media reader). The installed software resides on disk 21-n until invoked by the system 10. Once invoked, portions of the software are loaded into a memory unit 24-n, where instructions of the software are executed by one or more CPUs 12-1 through 12-n. During execution, the software creates data structures in memory 24-1 through 24-n. These structures may be paged to and from disk 21-n as is done in a conventional virtual memory system.

The INTEREL software includes a host based relational file manager (RFM) and an Operational Directory Interface (ODI) used for the storage of directory information. These components are described in greater detail in the publication entitled Bull Users Society Fall Conference Proceedings, Copyright, 1991 by Bull HN Information Systems Inc. These components are discussed herein only to the extent required for an understanding of the operational environment in which the multicache system of the present invention operates.

Figure 2:
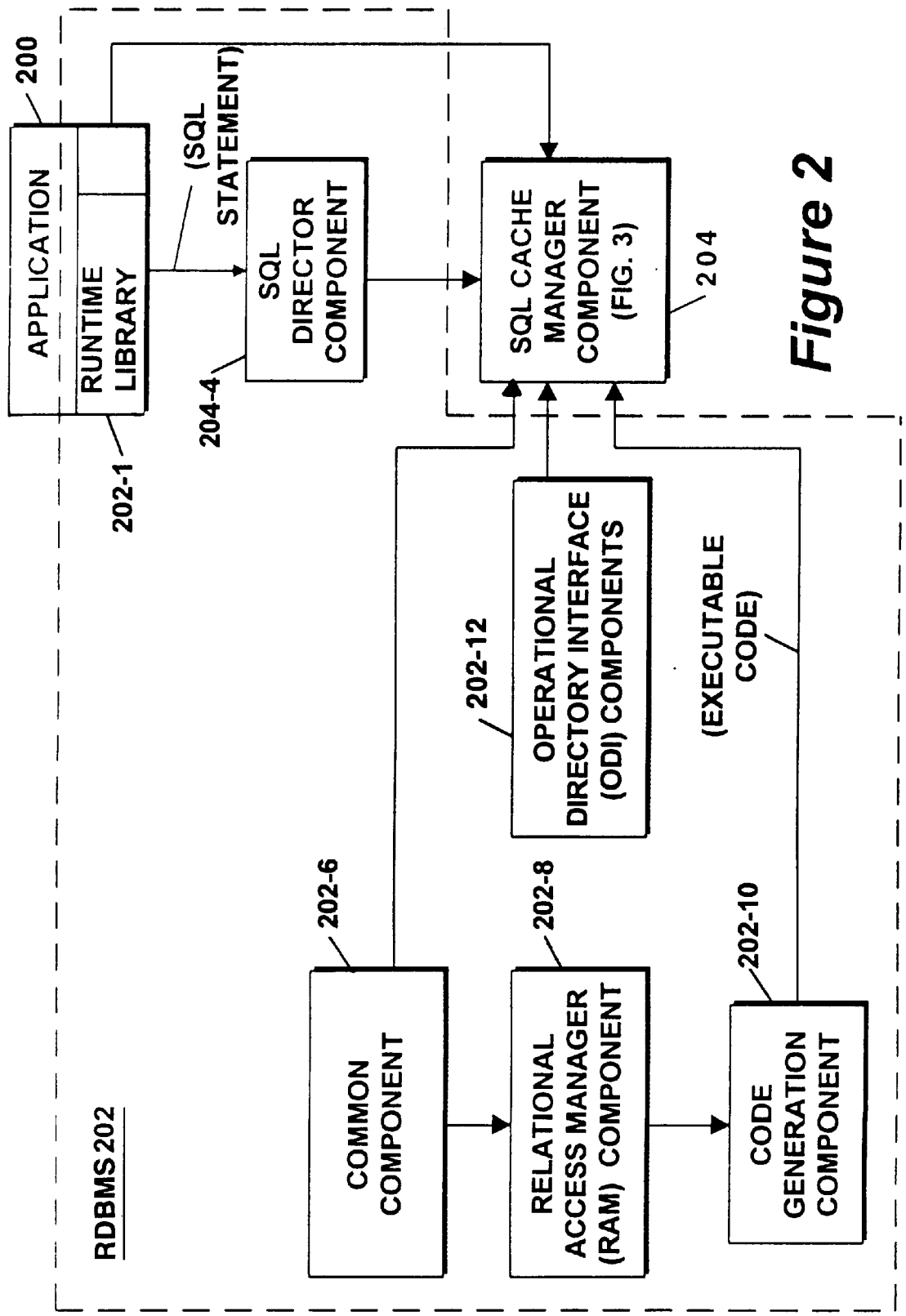
FIG. 2 is a block diagram illustrating in greater detail, the multilevel cache system organization that utilizes the teachings of the present invention.

FIG. 2 Database System Components

FIG. 2 illustrates in block diagram form, the major components of the preferred embodiment involved in processing database query statements. As shown, these components include the components of RDMS 202 (INTEREL software) and a SQL cache manager component which manages both local and central cache systems as described herein. In greater detail, RDMS 202 comprises a Runtime Library 202-1 serving as the application's interface to the RDMS 202, a SQL Director Component 202-4, a Common Component 202-6, a Relational Access Manager (RAM) component 202-8, a Code Generation component 202-10 containing support routines for acquiring information stored in a number of "Code Generation" structures for relating generated code and an Operational Directory Interface (ODI) component 202-12 arranged as shown.

The Runtime library 202-1 contains runtime routines bound into the application used by the application 200 for issuing calls. Each such call results in library 202-1 sending a query statement to Director component 202-4. The Director component 202-4 contains routines which analyze each query statement for determining if the statement is of a type that accesses RFM database files and thus is suitable for code generation and storage in the process's local cache. The Director component also contains routines that generate calls to Cache Manager component 204 to see if the code for that statement can be found in the process's local cache. The Director component 202-4 also contains routines invoked when the code is not found in local cache which issue calls to Relational Access Manager 302-8 via Common component 202-6 to process and potentially execute the query statement.

Also, as indicated, there is a path provided which enables the Common component 208 to call the ODI component 202-12 for deleting obsolete code through the SQL Cache Manager component 204. Lastly, the Common component 208 also directly communicates calls to the SQL Cache Manager component 204 when deleting obsolete code.

Figure 3A:
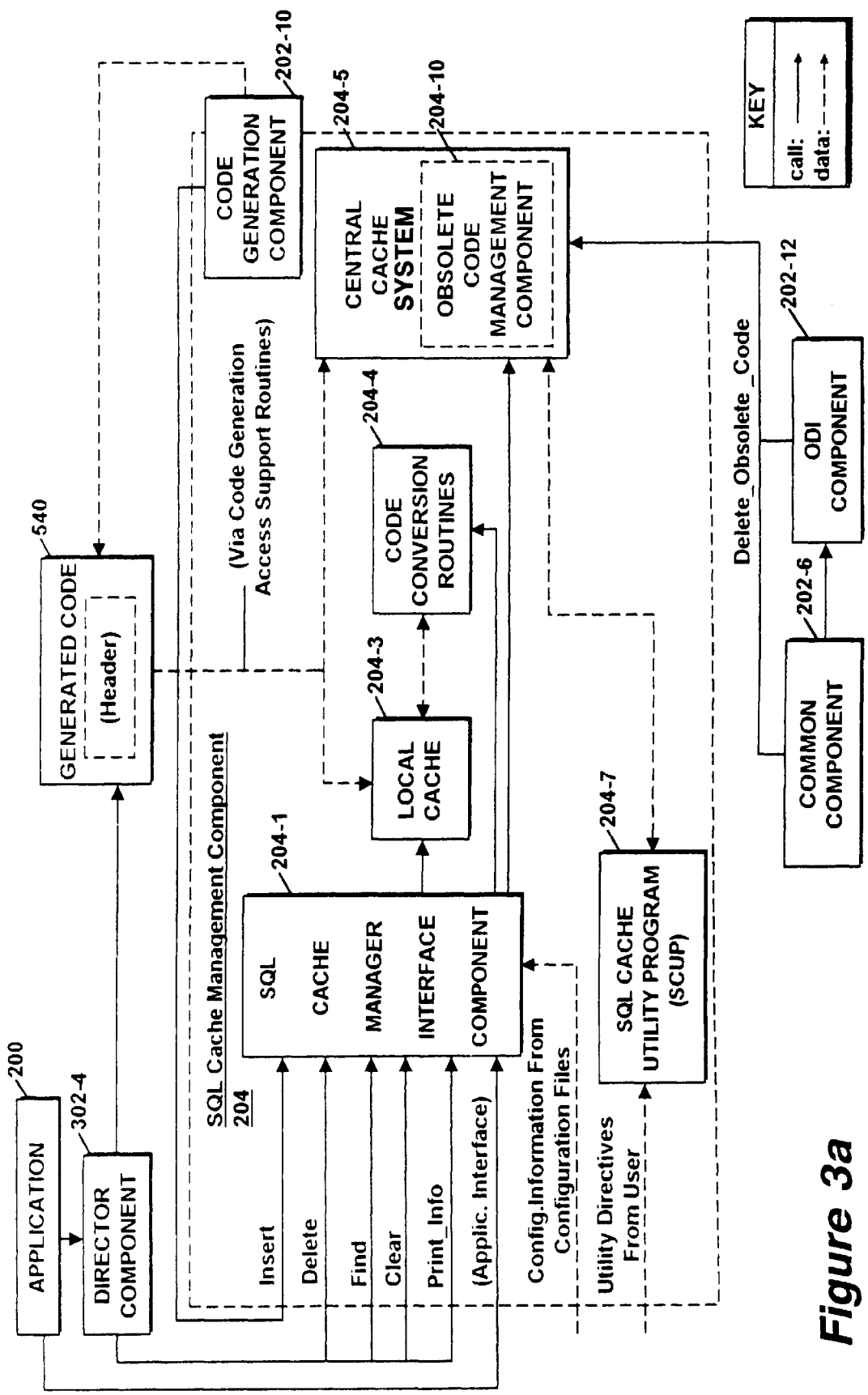
FIGS. 3a and 3b are block diagrams illustrating the operational flow in processing complex database statements.

FIG. 3a-SQL Cache Manager Components

FIG. 3a shows in greater detail, the components that comprise the SQL Cache Manager component 204 of FIG. 3a. The Cache Manager component 204 includes a number of routines for performing services involving cache entries associated with the central and local caches. Hence, a calling application does not differentiate between central and local cache; the application views them simply as "the cache".

As shown, the Cache Manager component 204 includes an internal programmable interface component 204-1, a local cache component 204-3, a central cache component 204-5, a SQL Cache Utility Program (SCUP) 204-7 and an Obsolete Code Management (OCM) component 204-10 of the present invention, all of which are operatively coupled as shown.

The programmable interface component 204-1 serves as the interface to both central and local cache components and is called by the Director component 202-4 to perform a number of internal operations as indicated in FIG. 3. As shown, these operations correspond to find, delete, clear, insert and print-info requests originally initiated by the SQL application 200.

The local cache component 204-3 and central cache component 204-5 correspond to those cache components which normally would have been created either during initialization or when a particular process is started, as described herein. Each cache component includes a search logic mechanism and associated control structures described in greater detail herein required for carrying out the processing of requests received from SQL Director component 202-4 via SQL Cache Manager Interface component 204-1. The local cache component 204-3 manages the storage of generated code within its process-local memory while central cache component 204-5 manages the storage of generated code within its shared area of memory.

As shown in FIG. 3a, both caches 204-3 and 204-5 operatively couple to Code Generation component 212 for receiving generated code header information for storage within their respective search logic mechanisms. Additionally, central cache component 204-5 couples to SQL cache utility program (SCUP) component 204-7. The SCUP component 204-7 is a batch program used for carrying a number of functions pertaining to the central cache component 204-5 in response to a set of utility directives via its interface with the central cache system 204-5.

Also, the central cache component 204-5 operatively couples to the OCM component 204-10 of the present invention. The calls to the OCM component provided by the different components of FIG. 3a are shown in more detail in FIG. 3b and are discussed in greater detail relative to this figure.

The local cache component 204-3 processes cache entries represented by L-nodes. Each L-node contains information related to one block of generated code. Some of the information is stored in the L-node while other information is merely pointed to by the L-node. For example, the generated code is not located in the L-node but a pointer to the code is stored in the L-node. Active L-nodes are linked into lists. A first set of lists is based on a hash value with each list containing L-nodes associated with a particular hash value. All L-nodes are also linked into a second list called a most recently used (MRU) list. This results in each used L-node being linked to two lists, a particular hash bucket list and the MRU list. The L-nodes not in use are linked at the end of the MRU list.

When a new L-node is to be inserted into cache, it is placed at the head of the appropriate hash bucket list and linked at the head of the MRU list. Both types of lists are doubly linked lists to allow for simple removal of entries or in the case of the MRU list, to allow for reordering. When an existing L-node in cache is accessed for use of the generated code, it is relinked to the head of the MRU list. Once local cache is full, each new entry causes the deletion of the least recently used entry, along with the associated generated code and the allocated memory is reused for the storage of the new entry.

Each L-node contains the following type of information fields: fields containing "next" and "previous" links to nodes in the same bucket; fields containing "next" and "previous" links to nodes in the MRU list, a code token field used to reference and call a piece of generated code; a model token field used to differentiate models in use by the process; a number of host variables; a SQL command type field and a size field for specifying the number of words of generated code.

Each central cache entry is represented by a C-node structure. As in the case of the local cache, the central cache system uses a bucket mechanism and a MRU list. The number of available entries, as well as the number of buckets, is not necessarily the same for the local and central cache systems. C-nodes differ somewhat in content from L-nodes, but share certain components such as those that link nodes to each other both within the same bucket and within their respective MRU chains. In contrast to L-nodes, a C-node does not contain a code token or a model token field. Instead of a code token field (which is a domain relative data type in the L-node), the central cache system has a list of descriptors that are indexed in parallel with the array of C-nodes. Each descriptor frames a segment of memory in the shared workspace that contains the associated code. The model token field in an L-node is used for storing a process relative value that cannot be used in the central cache system. Identification of the tables referenced by the generated code in the central cache system, qualified by owner and model are included with the generated code and are accessed by the central cache system through code generation data access macros. Additionally, there are a number of other structures that are used by the central cache system that relate to the current invention. These will be discussed in connection with FIG. 4.

For further information regarding the use of L-node structures, reference may be made to the publication entitled Database Products INTEREL Reference Manual INTEREL Performance Guidelines GCOS 8", Copyright 1995 by Bull HN Information Systems Inc., Order No. 67 A2 LZ93 REV01.

The Cache Manager component calls routines in the Code Generation component 202-10 and provides a code "token" as an input which is interpreted as a pointer to a generated code segment or to a data structure that contains the pointer to the code segment.

Figure 3B:
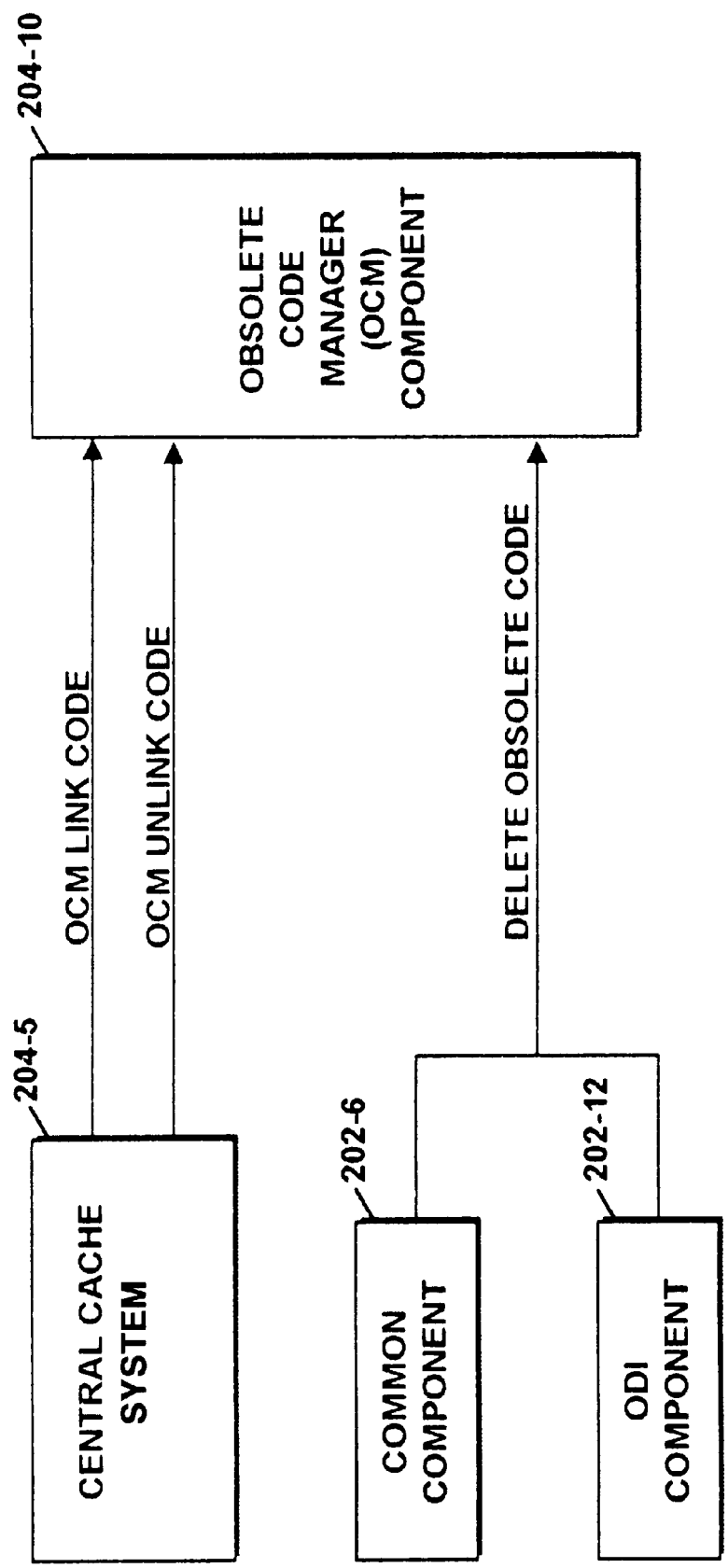

FIG. 3b-OCM Callers

FIG. 3b illustrates the calls to the OCM component. There are two classes of operations that are invoked when the OCM component 204-10 is called. One class of operation is used to report changes in the content of the central cache system. These operations are invoked by the Central Cache System 204-5 when entries are added to the cache or when entries are deleted from the cache. The OCM Link Code operation is invoked when an entry is added to the central cache system. The OCM Unlink Code operation is invoked when one or more entries are removed from the central cache system.

The other class of operation is used when events occur that may render code obsolete in the central cache. The OCM operation in this class is Delete Obsolete Code. This operation is invoked by the Common Component 202-6 or by the ODI Component 202-12 in response to certain DDL statements. Only those DDL statements that would result in code obsolescence require calls to the Delete Obsolete Code function of the OCM component. In the preferred embodiment, the code used to process each of the following DDL statement types is modified by inserting a call to the Delete Obsolete Code function of the OCM component:

alter table
drop table
drop tablespace
drop model
drop index
create index
grant
revoke.

Note that in the preferred embodiment, the drop model function is not handled as a SQL statement but rather is invoked as part of a model deletion utility function. However, for the processing performed by the OCM component as described herein, it is handled as a DDL-type SQL statement. That is, the code that processes the drop model operation is modified by inserting a call to the Delete Obsolete Code function. DDL statements, such as create table and create tablespace, do not require OCM involvement since they have no effect on the validity of entries already stored in the central cache system.

Figure 4:
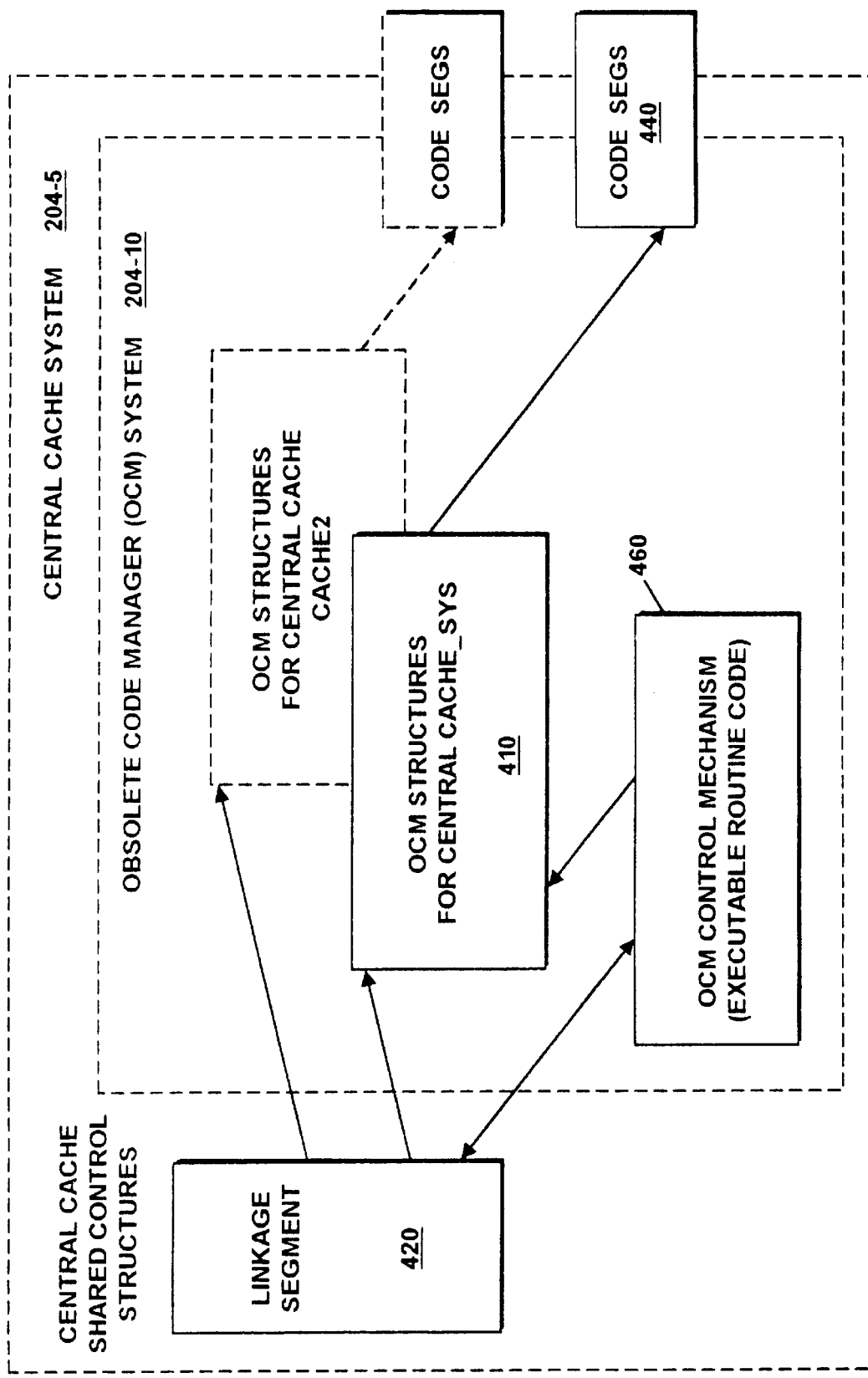
FIG. 4 is a block diagram illustrating the component structures of the present invention.

FIG. 4-Control Structures Organization

FIG. 4 illustrates the organization of control structures utilized by the central cache system and the OCM system of the present invention. As indicated, the central cache system includes a number of shared control structures, one of which is a linkage segment 420. The linkage segment can be viewed as an intermediate data structure that allows a process to indirectly reference locations within another data segment/section through pointers contained within the linkage segment. That is, connection to the data segments is made indirectly via the linkage segment of the process/procedure being executed. This type of mechanism allows processes to share data segments. Additionally, by storing central cache structures in a linkage segment, this ensures that such structures remain or persist in memory for a sufficiently long period of time (e.g. days, weeks etc. or until the system shuts down). An example of a linkage segments is described in further detail, in the text entitled, "The Multics System: An Examination of Its Structure", by Elliot I Organick, Copyright 1972 by MIT Press. For information regarding the structures utilized by the central cache system, reference may be made to the cited related patent application.

As shown, the linkage segment operatively couples to a set of structures utilized by each central cache system configured in the system. By way of example, it is assumed that two central cache systems have been configured by the system. The first central cache system configured is named "_SYS" while the second central cache system configured is named "CACHE2". As indicated, each such central cache system includes a set of OCM control structures 410 labeled _SYS and CACHE2 as shown that operatively couple to their respective code segments 440. Also, each such set of OCM structures operatively couple to an OCM control mechanism 460 that contains the routines for controlling the operation of each of the OCM systems as described herein.

Figure 5:
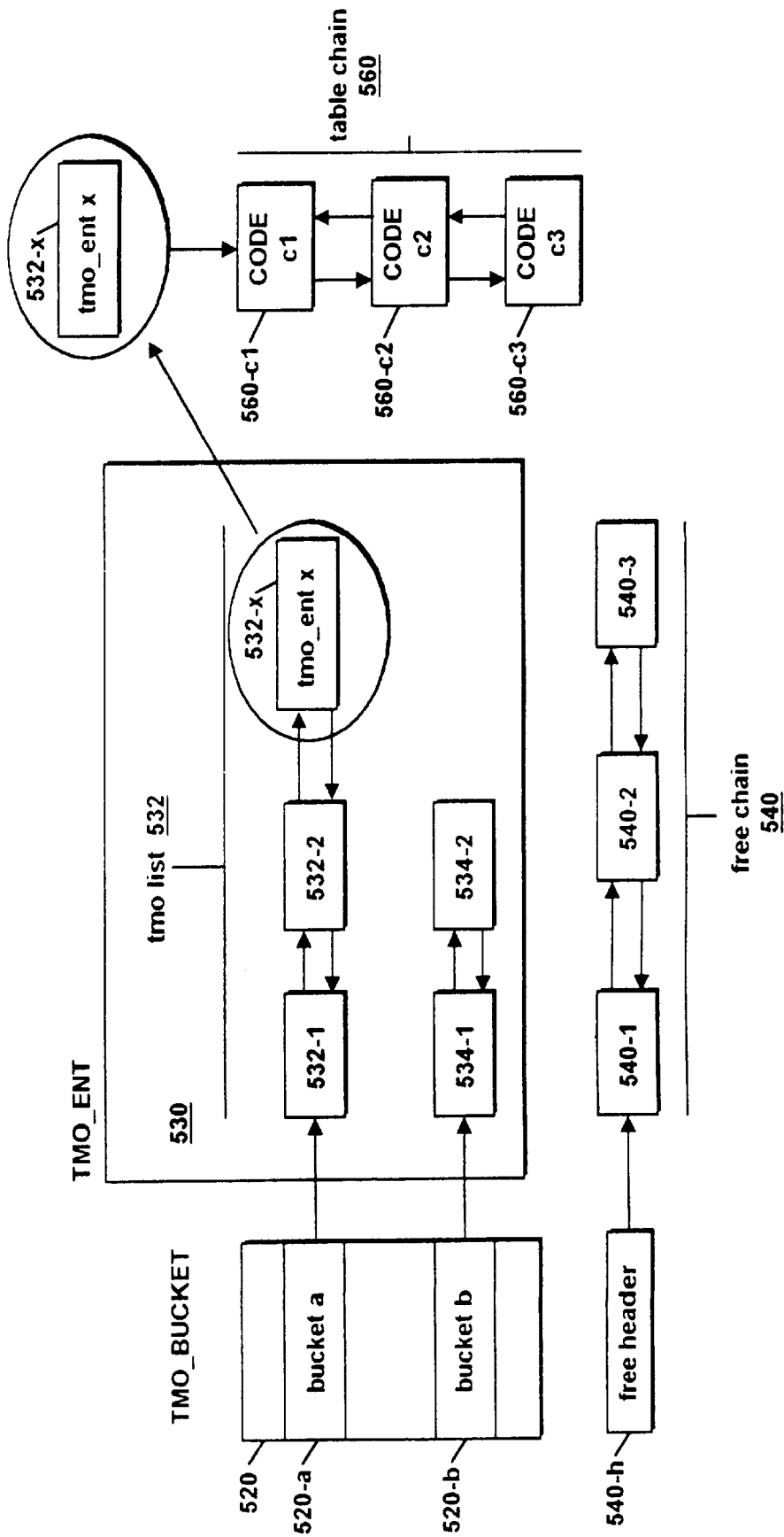
FIG. 5 illustrates the TMO control data structure utilized by the present invention.

FIG. 5-OCM Control Structures

As discussed above, the OCM component 204-10 utilizes a set of components that allow the efficient removal of entries in each central cache system when given information identifying the owner, model and table that are affected by a data definition language statement (DDL) action that results in one or more generated code entries in the cache system to become obsolete. When called to delete obsolete code entries, the OCM component 10-204 utilizes its components to quickly locate the affected cache entries.

The components of the OCM component 204-10 include a set of entries, each representing a particular combination of table, model and owner names. These entries representing the Table, Model and Owner names are referred to herein as TMO entries. At any particular time, there is one and only one TMO entry for each unique table that is referenced by all of the code segments 540 in the central cache system. If more than one code segment in the central cache system references a particular table, there is only one TMO entry for that table maintained by the OCM component 240-10. Furthermore, if there are code segments in the central cache system that reference more than one table, such as a code segment that contains machine instructions to execute a "join" function, there will be a TMO entry for each table referenced.

FIG. 5, illustrates in greater detail, the components of FIG. 4. As shown, the OCM structures include a TMO bucket structure 520 and a TMO entry structure 530 that includes a number of TMO list structures 532. The TMO entries are organized into the set of lists 532 to provide an efficient search of the TMO entries for the one entry that represents a particular table. As shown, each list 532 contains one or more TMO entries such as 532-1, 532-2, etc.

The particular list in which a TMO entry resides is determined by a hash function that in the preferred embodiment consists of a checksum of a string composed of the concatenated names of the table, model and owner, divided by the number of buckets. The remainder from the division determines the bucket. The number of buckets is determined when the central cache system is created and is based on the configured maximum number of tables rounded down to the nearest prime number.

The TMO bucket structure 520 contains entries for each bucket. When the hash function is calculated, the resulting value is used to index into the TMO bucket structure 520. If there is a TMO list for that bucket, the TMO bucket entry points to the first TMO entry in that list. In FIG. 5, the bucket entry for bucket a, 520*a*, points to the first TMO entry of its associated list 523-1. The bucket entry for bucket b, 520*b*, points to the first TMO entry in its list 534-1.

Figure 6A:
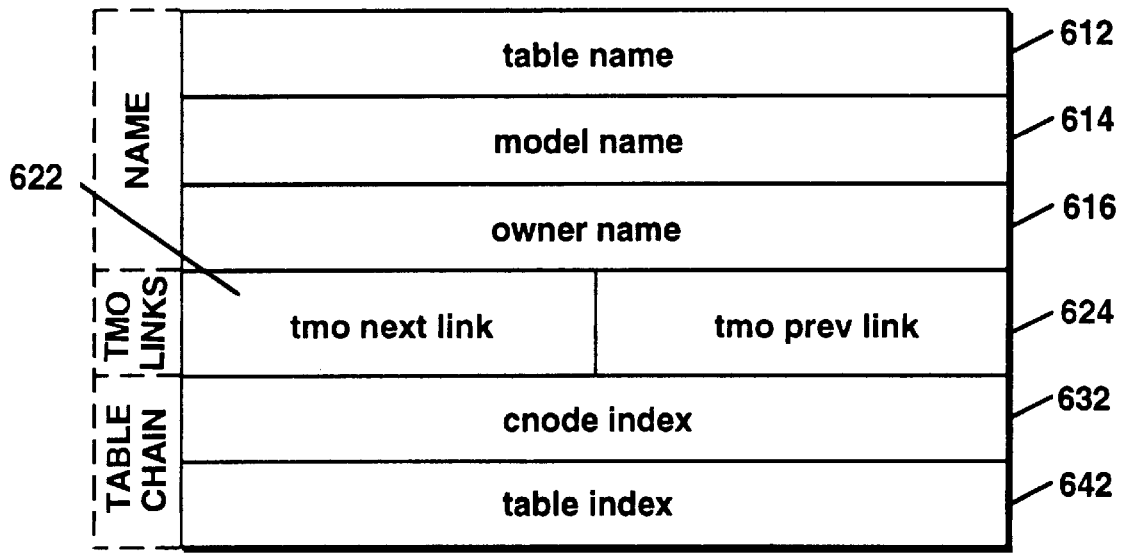
FIG. 6a illustrates in greater detail, a TMO entry utilized by the present invention.

Once the hash function is calculated and the particular bucket is determined, the entries in the associated list are searched for an entry that contains the table, model and owner name that has been input into the OCM component 240-10. The structure of the TMO entry is illustrated in FIG. 6*a* and will be discussed in greater detail with reference to that figure. There are a fixed number of TMO entries. Unused TMO entries are not linked into any of the bucket lists but rather are linked onto a free chain represented by free chain structure 540. The free entries are denoted in FIG. 5 by blocks 540-1 through 540-3. The free chain structure is pointed to by a free chain header structure 540-h.

Each active TMO entry, that is, each TMO entry that is contained in a bucket list and not in the free chain, is associated with one or more code segments in the central cache system. Each code segment associated with a TMO entry references the table represented by the particular TMO entry. The association between the TMO entry and the code segments that reference the table of the TMO entry is defined by another doubly linked list that corresponds to table chain structure 560 in FIG. 5. The entries of a table chain are not represented by a separate structure but rather by the code segments themselves. The linkages between code segments in a table chain are defined in the header information of each code segment and are shown in detail in FIGS. 6*a* and 6*b* and will be explained with reference to those figures. As shown in FIG. 5, the first code segment in a table chain is pointed to by a TMO entry corresponding to block 532-x.

FIG. 6*a*-TMO Entry Structure

As indicated, each TMO entry contains a name area containing fields for the table name 612, the model name 614 and the owner name 616 in that order. The order of the table, model and owner names (TMO) provides an efficient string comparison of the composite name area for the following reasons. In a relational database system of the preferred embodiment, a table name must be unique within a particular model and a particular model must be unique for a particular database owner. In a typical production database system, there may be a small number of owners in the system. Each of these owners may have multiple models. Each of these models may contain multiple tables. Therefore, in such a system, when comparing table, model and owner names, the table name will vary the most, the owner name will vary the least and model name will vary somewhere in between the two. By making a composite field of the table, model and owner names, a single string comparison may be performed to determine a match of all three fields. By putting the field that varies most at the start of the composite field, the elimination of a potential match may be made the quickest. Since the string comparison machine instruction in many processors can stop once the possibility of a match is eliminated, this field ordering can maximize the performance of the search operation.

As shown in FIG. 6a, the TMO entry structure also contains forward and backward links (tmo next link) and (tmo prev link) 622 and 624 respectively, that are used to link the TMO entries in TMO list 532. The first code segment of the table chain associated with the TMO entry is represented by the central cache system "cnode" entry, the index of which is specified in a field within the TMO entry 632. A segment of generated code in a central cache system may reference more than one table. Such a code segment will be an entry in multiple table chains. Therefore, when a TMO entry refers to a code segment of a table chain or when a code segment in a table chain refers to another code segment in that table chain, not only must the cnode index be used but also a table index. The table index is relative to a particular code segment and is used to differentiate between the different table chains in which the code segment is linked. In a TMO entry, the table index is stored in a particular field 642.

FIG. 6b-Linkages

Figure 6C:
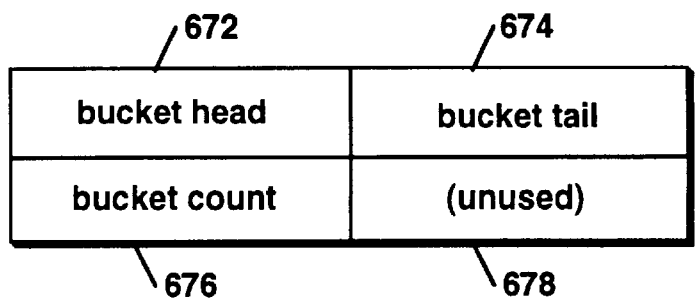
FIG. 6c illustrates the bucket structure utilized by the present invention.
Figure 6B:
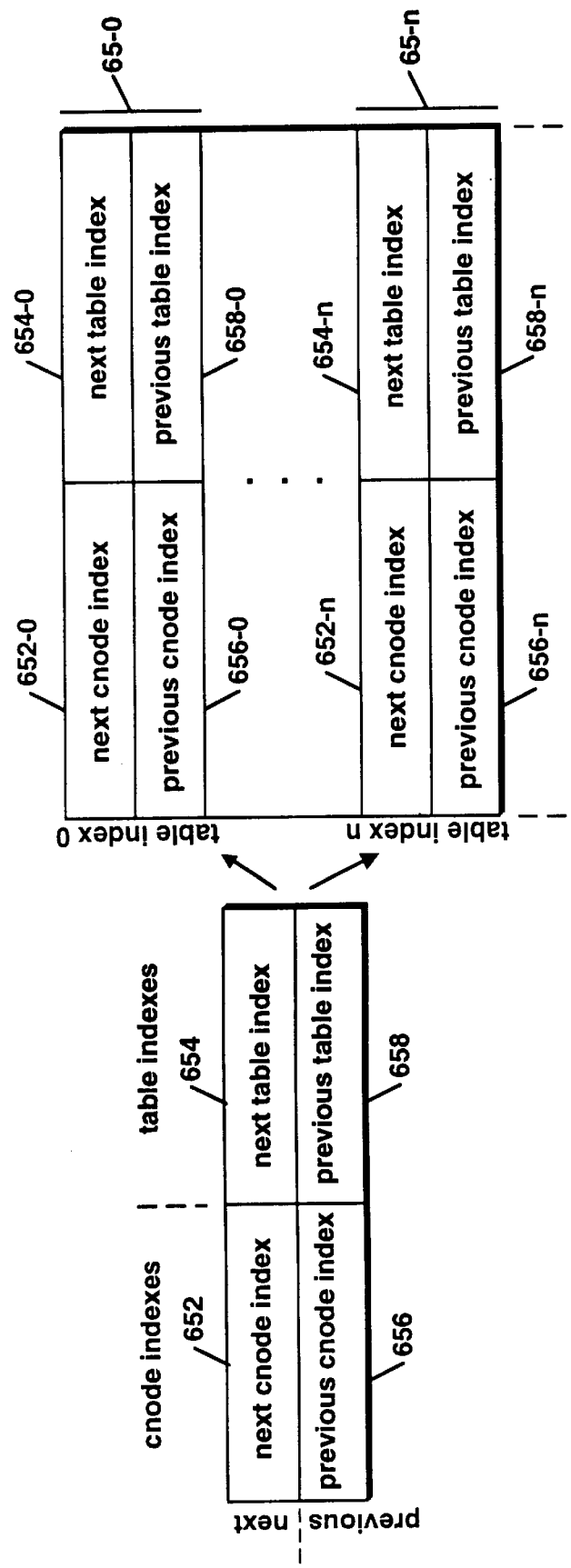

FIG. 6b illustrates the linkages connecting the code segments within a table chain. For each table chain, there is a forward link and a backward link. Each of these links is comprised of a cnode index and a table index. In FIG. 6b, the cnode index of the "next" code segment in the table chain is represented by next cnode index 652. The table index of the "next" code segment in the table chain is represented by next table index 654. The cnode index of the "previous" code segment in the table chain is represented by previous cnode index 656. The table index of the "previous" code segment in the table chain is represented by previous table index 658.

There is a set of these four items, represented by blocks 65-0 through 65-n for each table that is referenced by a code segment. Each set is indexed by the table index portion of the linkage prior to and subsequent to a particular code segment in a table chain. The space of this linkage information is allocated in the header area of the code segment when the code is being generated. Space is allocated to allow a set of linkage information for each table referenced by the generated code. The linkage information is stored in this allocated space when the code is inserted into the central cache system and the code is linked into the appropriate table chains by the OCM component 204-10.

FIG. 6c13 TMO Bucket

FIG. 6c shows the detail of an individual TMO Bucket entry such as 520-a. each TMO bucket entry consists of a bucket head 672, a bucket tail 674, and a count of the number of entries in the bucket 676. Note that this is not the same as the number of buckets. There is also an unused area in the bucket entry 678 in the preferred embodiment that exists merely to make the bucket entry size an even quantity. The bucket head 672 and the bucket tail 674 contain an index in the array of all TMO entries 530 that specifies the TMO entries at the beginning and end respectively of a single TMO list 532.

Figure 7A:
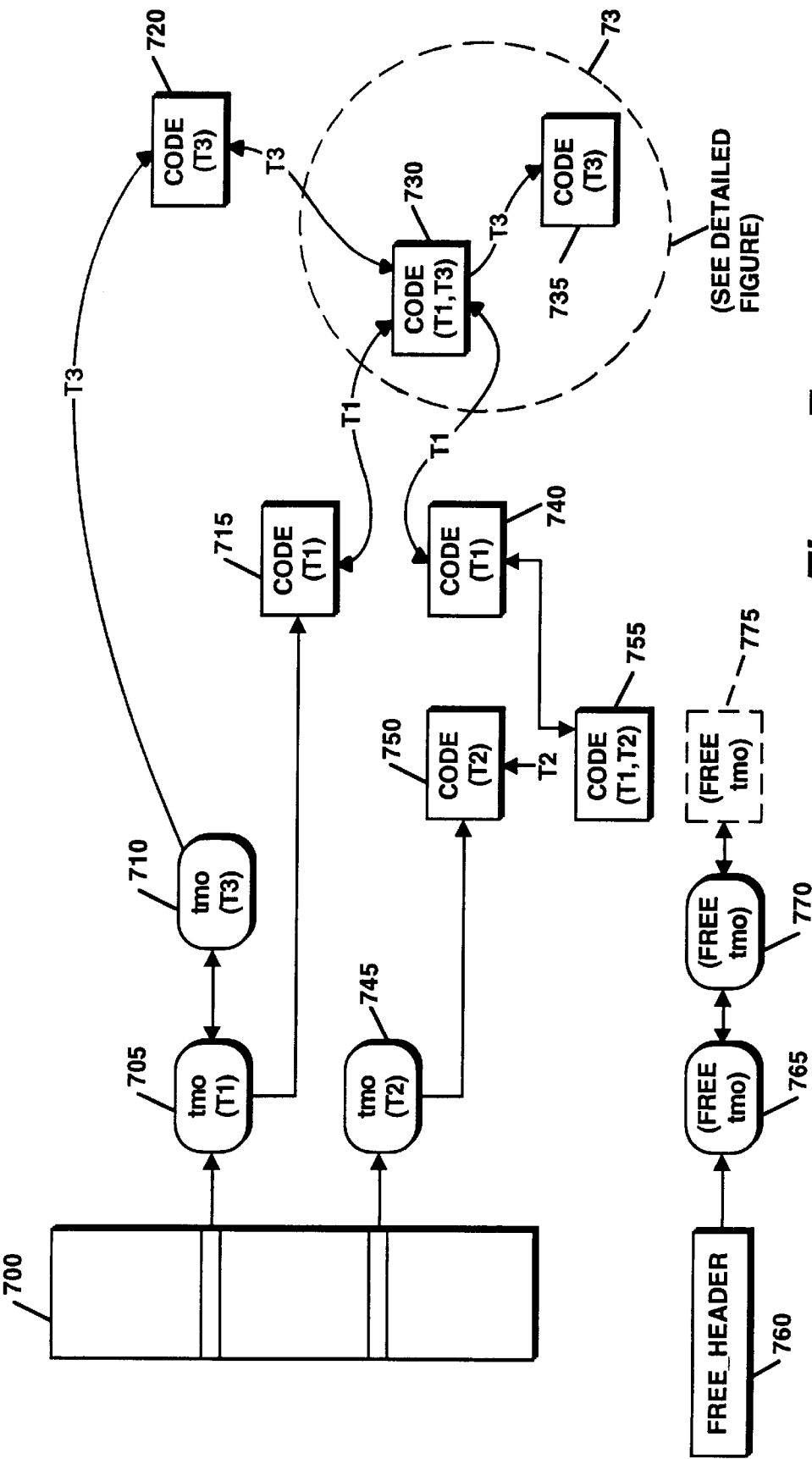
FIGS. 7a and 7b are examples of table chain linkages utilized in the present invention.
Figure 7B:
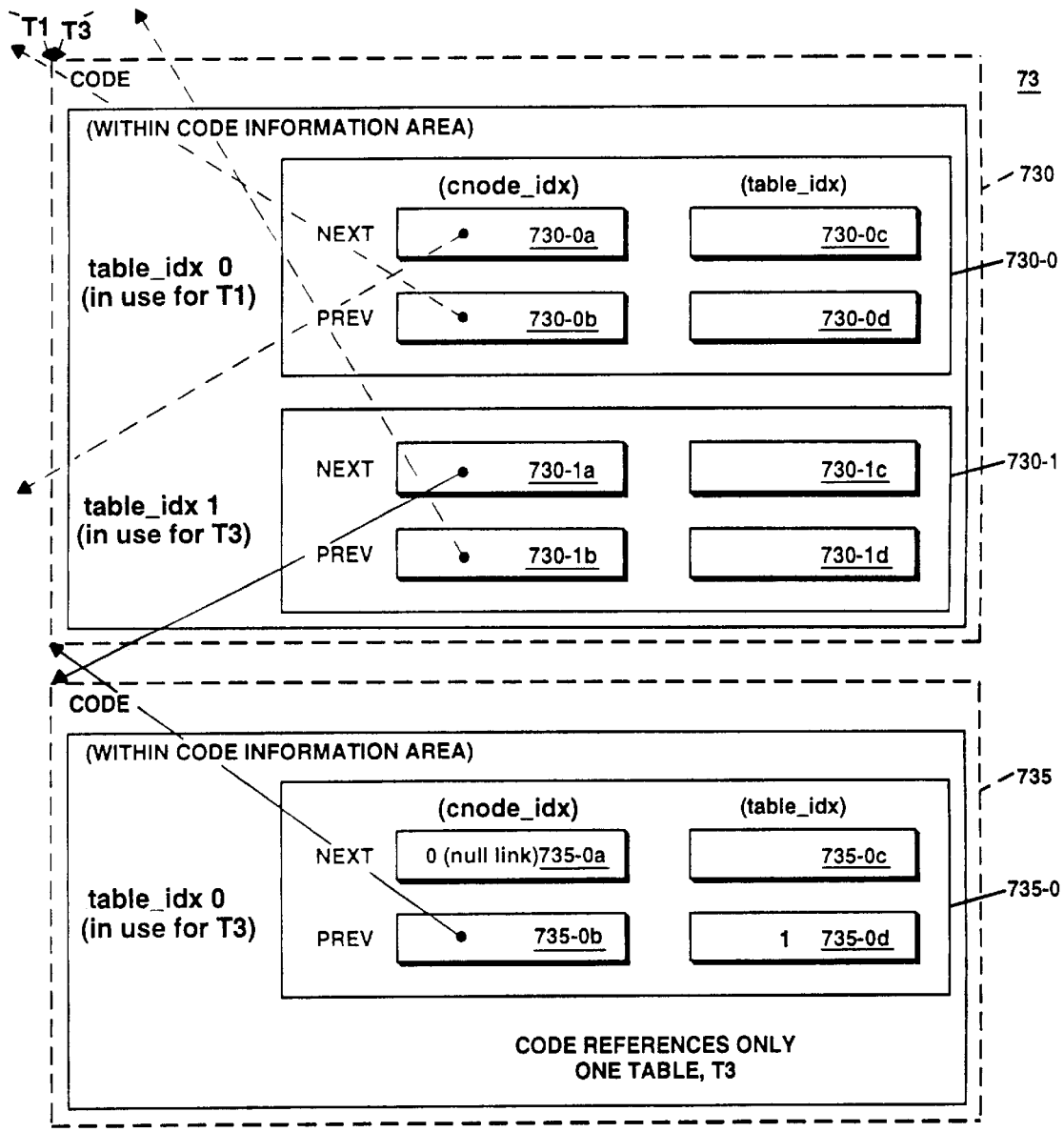

FIGS. 7a and 7b-example

FIG. 7a illustrates an example of the linkages of the table chains. In FIG. 7a, seven code segments are represented by rectangles 715, 720, 730, 735, 740, 750 and 755. These code segments represent SQL statements that reference one or more of the tables T1, T2 and T3. The tables that are referenced by the SQL statement of each code segment is represented within the parentheses in the boxes representing each code segment. For example, the code segment labeled 715 references table T1; the code segment labeled 720 references table T3; the code segment labeled 730 references both tables T1 and T3 (i.e., as in a "join" type of SQL statement), etc. For each of the tables T1, T2 and T3, there is a table chain upon which are designated the code segments that reference the associated table(s). Each of these chains is pointed to by a unique TMO entry. In FIG. 7a, TMO entries are represented by rectangles with rounded corners. The table chain for table T1 is pointed to by the TMO entry labeled 705 and the chain is indicated as containing code segments 715, 730 and 740. The table chain for table T2 is pointed to by the TMO entry labeled 710 and is indicated as containing code segments 720, 730 and 735. It will be noted that the TMO entries 705 and 710 are shown as both being in the same hash bucket list. Also, it will be noted that code segment 730 is linked into the table chains for tables T1 and T2. The specific chain linkages in the circular area 73 are shown in greater detail in FIG. 7b.

More specifically, FIG. 7b illustrates the details of code segments 730 and 735. As shown, code segment 730 is linked into the table chains for tables T1 and T3. Code segment is shown as only being linked into the table chain for table T3. With respect to the table chain for table T1, another code segment points to code segment 730. Since code segment 730 is linked into two different table chains, two separate linkage areas labeled as 730-0 and 730-1 are required. The first linkage area 730-0 is used to point to the next code segment in the chain for T1 as well as the previous code segment in the chain. The next code segment in the chain for T1 is described by the cnode index at 730-0a. Since this next code segment may also be linked into more than one table chain, the specific linkage area for the next code segment is also required and is located at 730-0c. The content of this area, the table index, is an integer value representing the appropriate linkage area (zero-based) of the next code segment in the table chain. Similarly, the previous code segment in the table chain for T1 is determined by the cnode index at location 730-0b and the table index at location 730-0d.

In this example, code segment 730 is also linked into the chain for table T3. The previous code segment in this chain is determined by the cnode index at location 730-1b and the table index at location 730-1d. However, the next code segment in the chain for T3 is code segment 735 which is the other code segment in this figure. The cnode index at location 730-1a is the cnode index for code segment 735. The table index at location 730-1c contains a zero value representing the first and only linkage area in code segment 735, namely, 735-0. Since code segment 735 is the last code segment in the table chain for table T3, the next link has a zero value for the code index at location 735-0a. It will be noted that cnode indexes are one based. Since the cnode index is zero, the table index at location 735-0c is unused. The previous code segment in this chain is 730. This is determined by the cnode index at location 735-0b that contains the cnode index of code segment 730. The table index at location 735-0d contains a one value. This means that the linkage area used for this table chain which in the previous code segment is to the second area 730-1 (the area indexes are zero based). The combination of the cnode index at location 735-0b and the table index at location 735-0d comprise the backward link in the table chain for table T3.

DESCRIPTION OF OPERATION

With reference to FIGS. 1 through 9g, the operation of the OCM component of the present invention will now be described. FIG. 8a illustrates the main operations that are executed by the OCM component 204-10 of the present invention. These operations are an OCM link code operation of block 820, an OCM unlink code operation of block 825 and a delete obsolete code operation of block 870. These operations are illustrated in greater detail in FIGS. 8b, 8c and 8d.

Figure 8A:
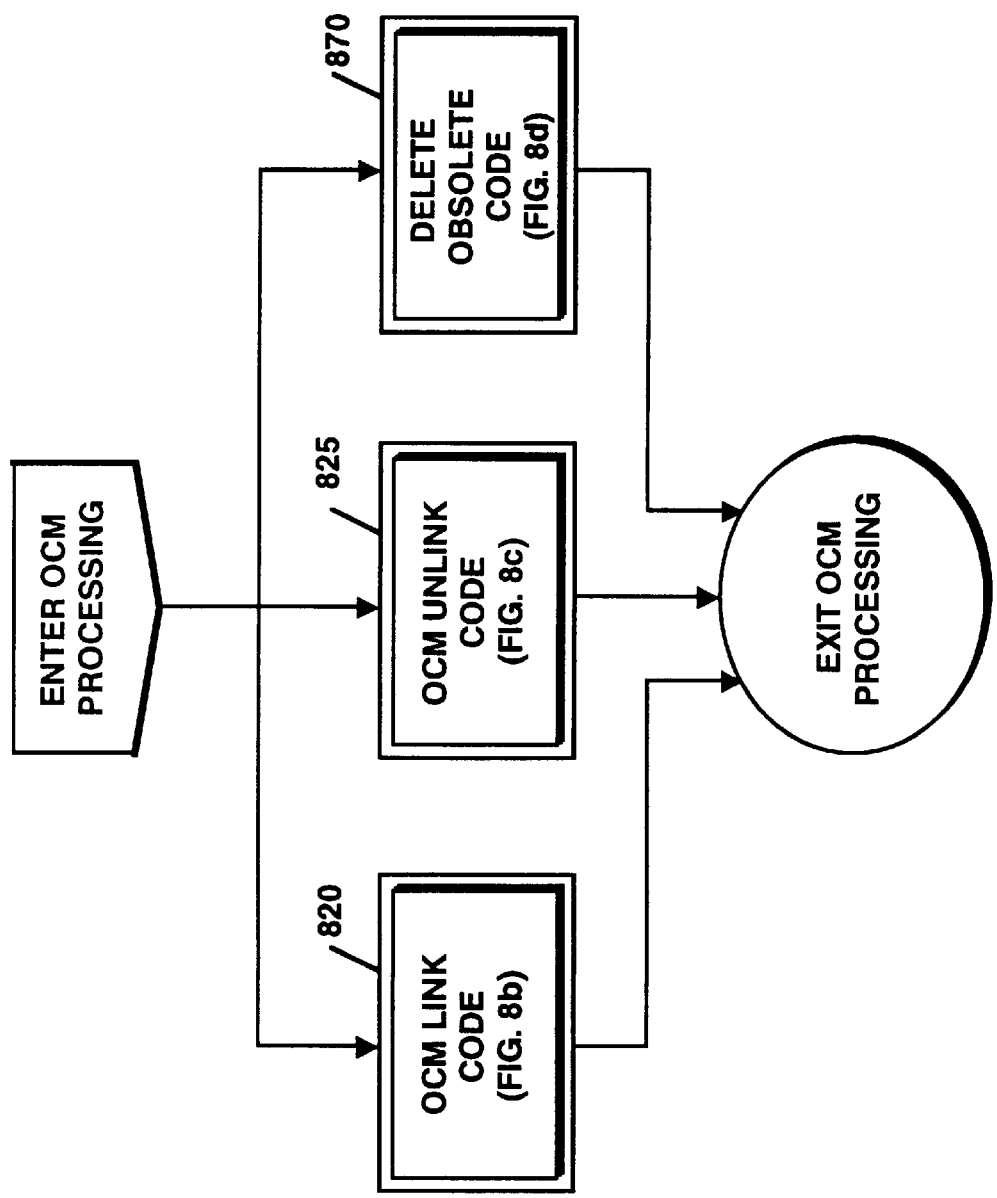
FIGS. 8a through 8e are flow diagrams that illustrate the operations performed by the OCM system of the present invention.

The OCM is called during three different circumstances that map to the three operations shown in FIG. 8a. The OCM Link Code operation 820 is performed whenever code is inserted into the central cache. The OCM Unlink Code operation 825 is performed whenever code is deleted from the central cache, and regardless of whether the deletion is explicit or as a result of cache entry replacement.

In contrast to the above mentioned two operations which are called during normal data manipulation SQL statement processing, the Delete Obsolete Code operation 870 is called during the processing of DDL statements. As was explained earlier, not all DDL statements are affected. Only those DDL statements which would result in code obsolescence require calls to the Delete Obsolete Code operation of the OCM. For further information regarding the overall SQL processing, reference may be made to the previously cited parent patent application.

Figure 8B:
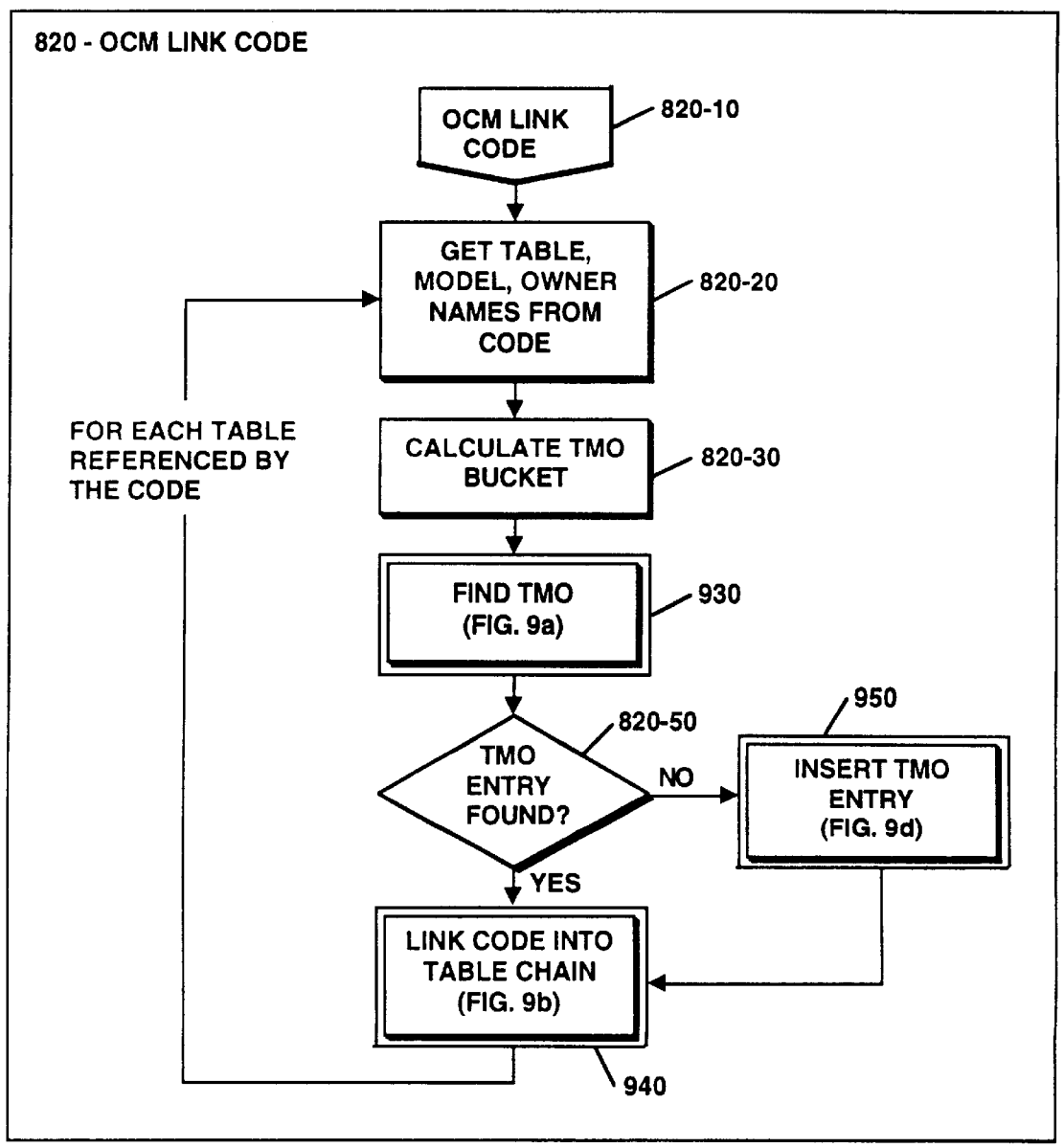

Considering the main operations of OCM component 204-10 in greater detail, reference is first made to FIG. 8b. When a code segment 540 is inserted into a central cache system that includes an OCM component, the OCM component obtains control to store the appropriate information within the OCM structures of FIG. 4 of the particular central cache 500. As indicated in FIG. 8a, the OCM link code operation is entered as indicated in block 820-10. As indicated in block 820-20, the OCM component 204-10 gets the table, model and owner names from the code segment being inserted. That is, for each table referenced by the inserted segment of code, the OCM hash function is performed on the table, model and owner names obtained from the code segment. The result determines (i.e., used to calculate) the OCM bucket in which the TMO entry is to reside as indicated in block 820-30.

Next, as indicated in block 820-930, the OCM component 204-10 executes a search operation to find the TMO entry. That is, the list of TMO entries of that bucket is searched for an entry that matches the table, model and owner names. This operation is described in greater detail, in FIG. 9a. Briefly, the OCM component 204-10 enters the find TMO routine and then executes the sequence of operations indicated in blocks 930-20 through 930-60. At the completion of the sequence, the find TMO routine returns an entry found or entry not found indication back to block 820-50 of FIG. 8b.

If the TMO entry is not found as determined by block 820-50, the OCM component then acquires an unused TMO entry from the free chain structure 540 and links the entry into the appropriate TMO list as indicated in block 950. The linkage information consisting of the cnode index of the inserted code and a table index is stored in the TMO entry. This operation is shown in greater detail in FIG. 9d. Briefly, OCM component 204-10 enters the Insert TMO entry routine and then executes the sequence of operations of blocks 960 and 950-30 through 950-50. The operations of block 960 result in the execution of the sequence of operations represented in blocks 960-20 and 960-30 of FIG. 9f.

If the applicable TMO entry was found in the TMO list, as determined by block 820-50, then the code is linked into the table chain pointed to by the found TMO entry 560 as indicated in block 940. This operation is shown in greater detail in FIG. 9b. Briefly, the OCM component 204-10 enters the Link Code into Table Chain routine and then executes the sequence of operations of blocks 940-20 through 940-40. The flow illustrated in FIG. 8b is repeated for each table referenced by the inserted code segment. However, for each successive table, a different linkage set 65-n is used in the header area of the inserted code segment.

Figure 8C:
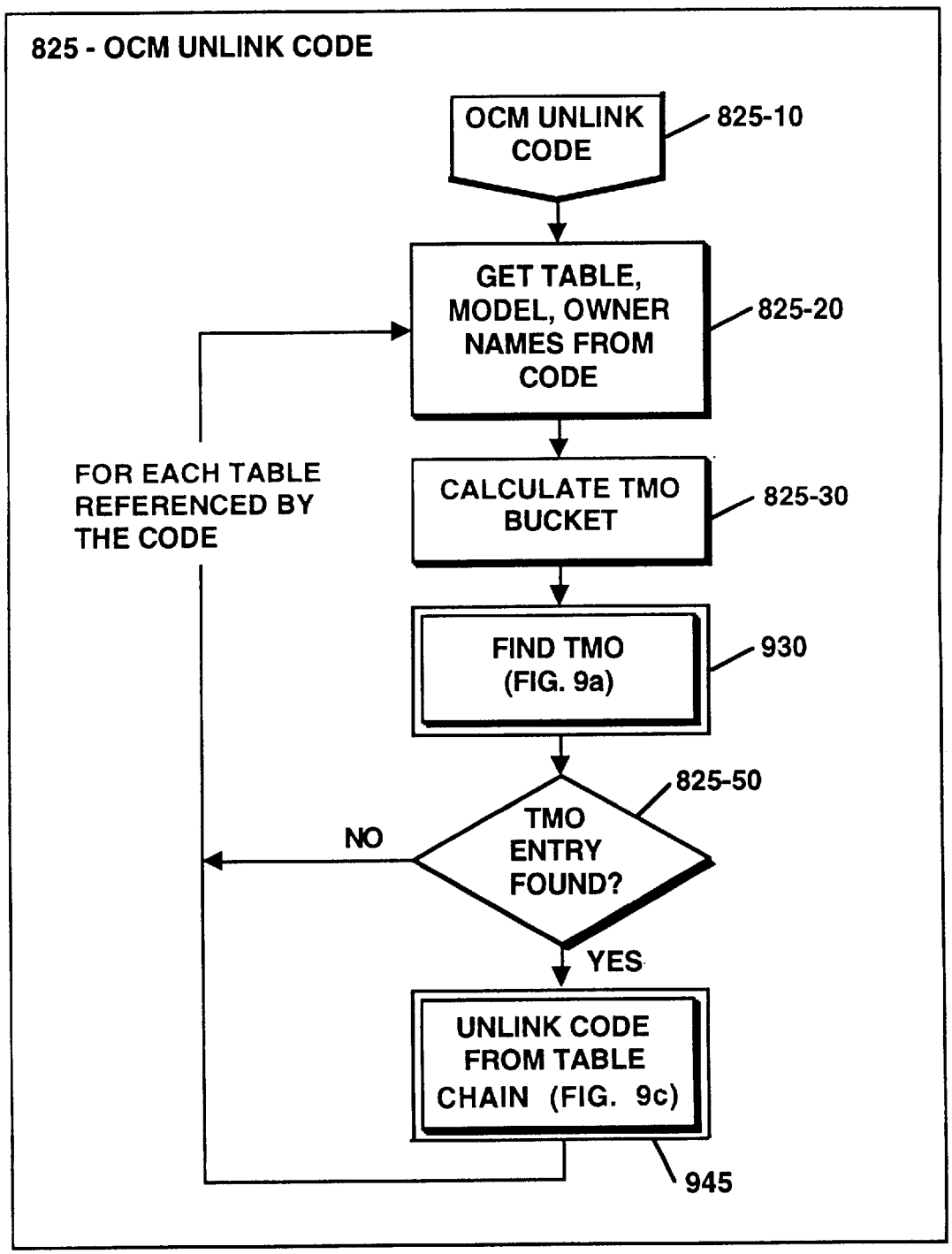

As indicated in FIG. 8a, when a code entry is removed from the central cache system, OCM component 204-10 executes the OCM unlink code sequence of operations of FIG. 8c. For each table referenced by the code segment to be deleted, the OCM hash function is performed on the table, model and owner names. These names are acquired from the code segment being deleted as indicated in block 825-20. This operation is used to determine the OCM bucket in which the TMO entry for the table resides as indicated in block 825-30. As indicated in block 930, the list of TMO entries of that bucket is searched for an entry that matches the table, model and owner names. As previously discussed, this operation is illustrated in greater detail in FIG. 9a.

If the TMO entry is found, as determined in block 825-50, the code segment to be deleted is removed from the table chain pointed to by the TMO entry as indicated in block 945. This operation is shown in greater detail in FIG. 9c. Briefly, the OCM component 204-10 executes the sequence of operations of blocks 945-20 through 955. To execute the delete TMO entry operation, the OCM component executes the sequence of operations of blocks 955-20 through 955-50 of FIG. 9e. If the code segment being deleted is the last (i.e., only code segment in the table chain), then the TMO entry is also deleted, that is, it is removed from the TMO list in which it resided and is placed on the free chain. As indicated, this sequence of operations is repeated for each table referenced by the code segment to be deleted. That is, the code segment is removed from each table chain in which it is linked.

Figure 8D:
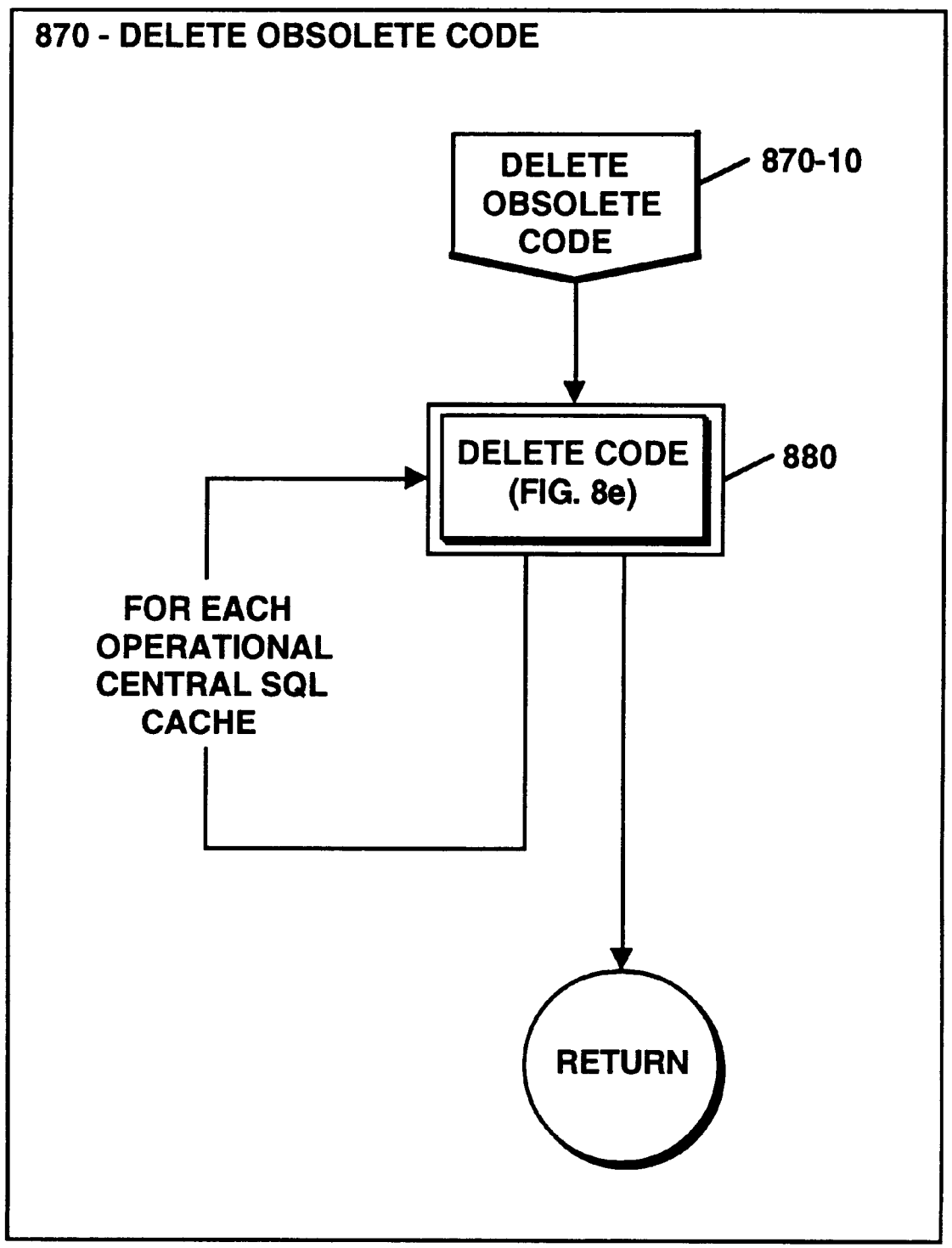

FIG. 8d illustrates in greater detail, the delete obsolete code operation of block 870 of FIG. 8a. When a DDL operation occurs, the OCM component 204-10 is called to delete the code segment that is made obsolete by such DDL. In response to the DDL operation that affects a particular table or tables, the OCM component 204-10 executes the operations illustrated in FIG. 8d. As indicated in FIG. 8d, if there is more than one central cache system configured in the system, each cache is required to be searched for the obsolete code segment and if found, such code is deleted by the particular OCM component as indicated in block 880. The delete code operation of block 880 is illustrated in greater detail in FIG. 8e.

Figure 8E:
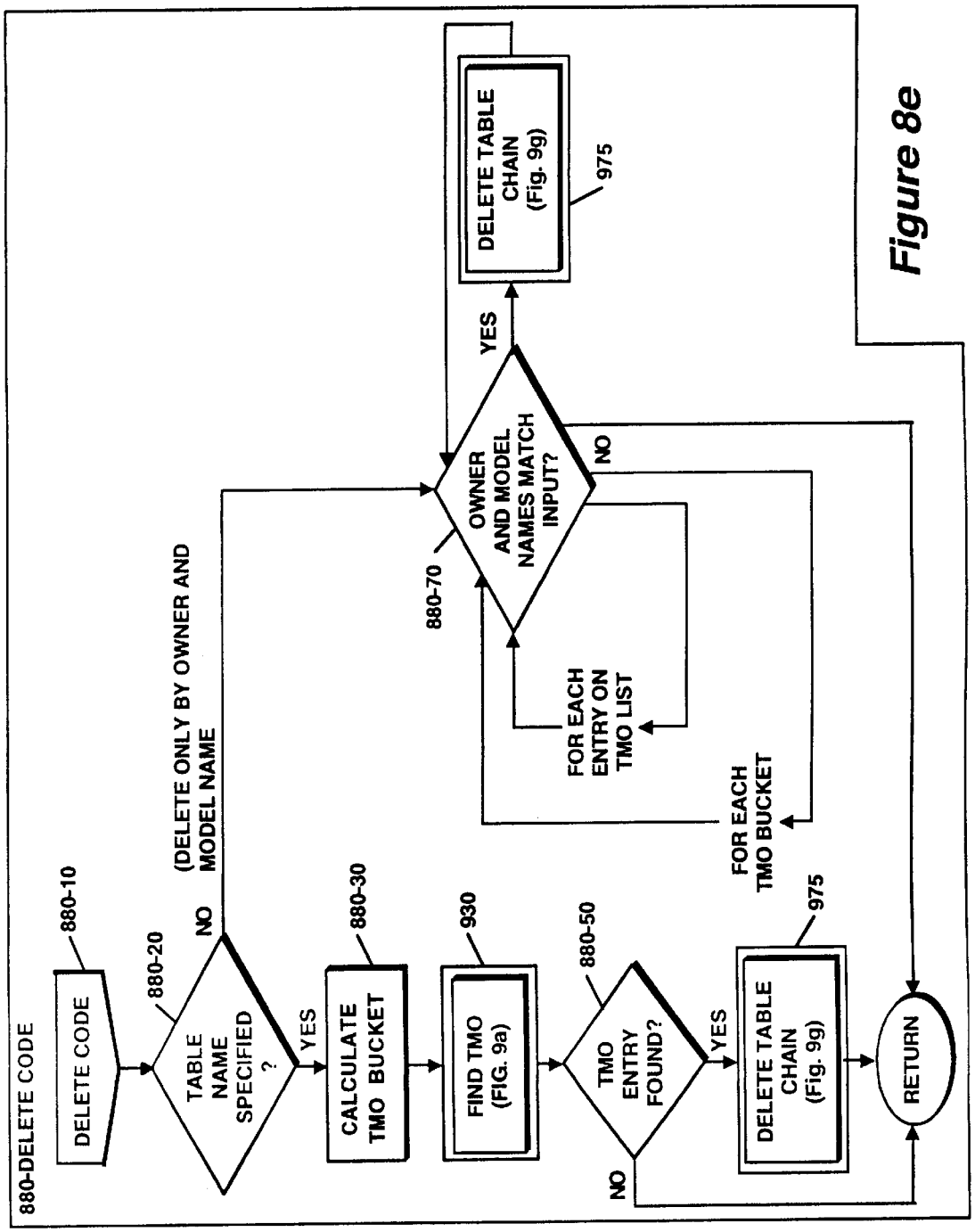

As indicated in FIG. 8e, the code deletion that must occur for each central cache system starts with the sequence of operations that follow the "yes" path out of block 880-20. As indicated in block 880-30, the OCM hash function is performed on the table, model and owner names for the affected table. This operation is used to determine the OCM bucket in which the TMO entry resides as indicated in block 880-30. The list of TMO entries of that bucket is searched for an entry that matches the table, model and owner names as indicated in block 930. As discussed above, the operations of block 930 are illustrated in greater detail in FIG. 9a.

If no such TMO entry is found as determined by block 880-50, then the entire table chain pointed to by the TMO entry is traversed and each code segment in the table chain is deleted as indicated in block 975. This operation is described in greater detail in FIG. 9g. Since DDL operations that make obsolete all code segments that reference a particular model or particular owner are typically much less common than DDL operations that only affect a single table, the OCM component 204-10 is optimized to handle the latter case with the greatest efficiency. When a DDL operation only affects a specific table, the associated TMO entry can be found within a single TMO bucket and therefore only a very limited number of TMO entries have to be compared with the name of the table affected. This comparison is performed during the flow represented by block 930, and described in more detail in FIG. 9*a*. By contrast, when the DDL operation affects a particular owner or model, then every TMO must be checked for a match or that owner and model. This iteration of each TMO entry is shown by block 880-70 and the nested looping represented by the cycle flow lines around block 880-70.

Figure 9A:
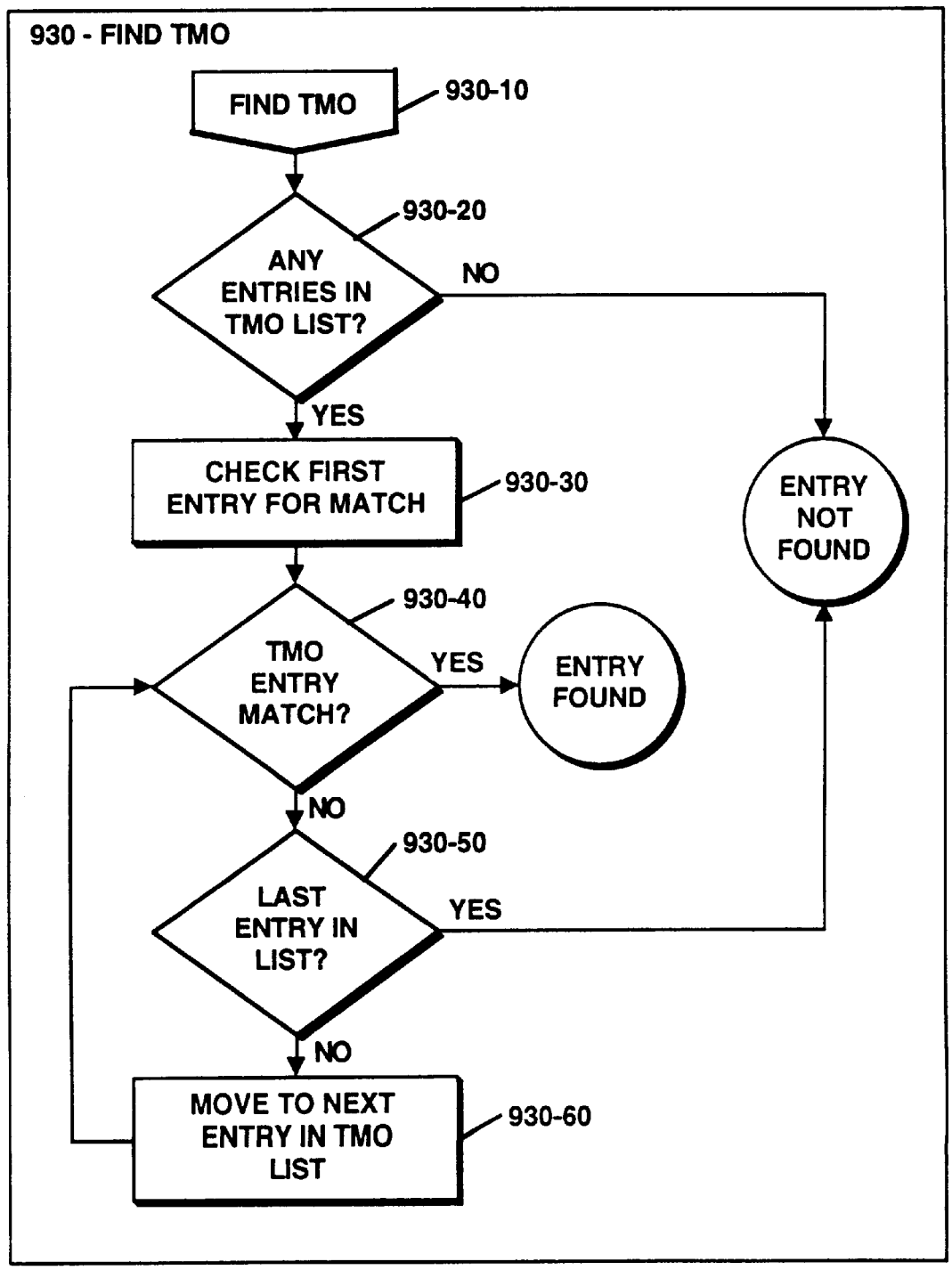
FIGS. 9a through 9g are flow diagrams illustrating in greater detail, the operations contained in the flow diagrams of FIGS. 8a through 8e.
Figure 9B:
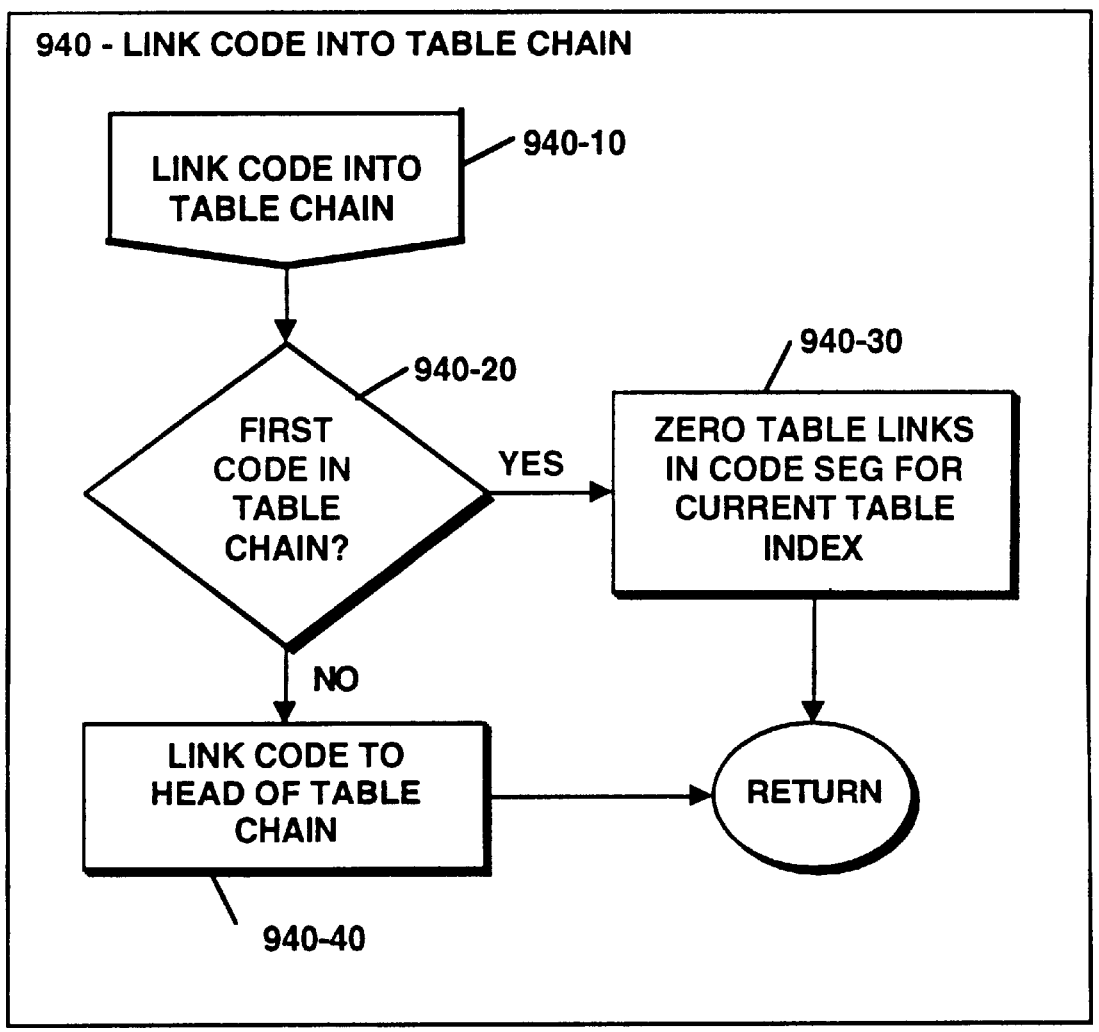
Figure 9C:
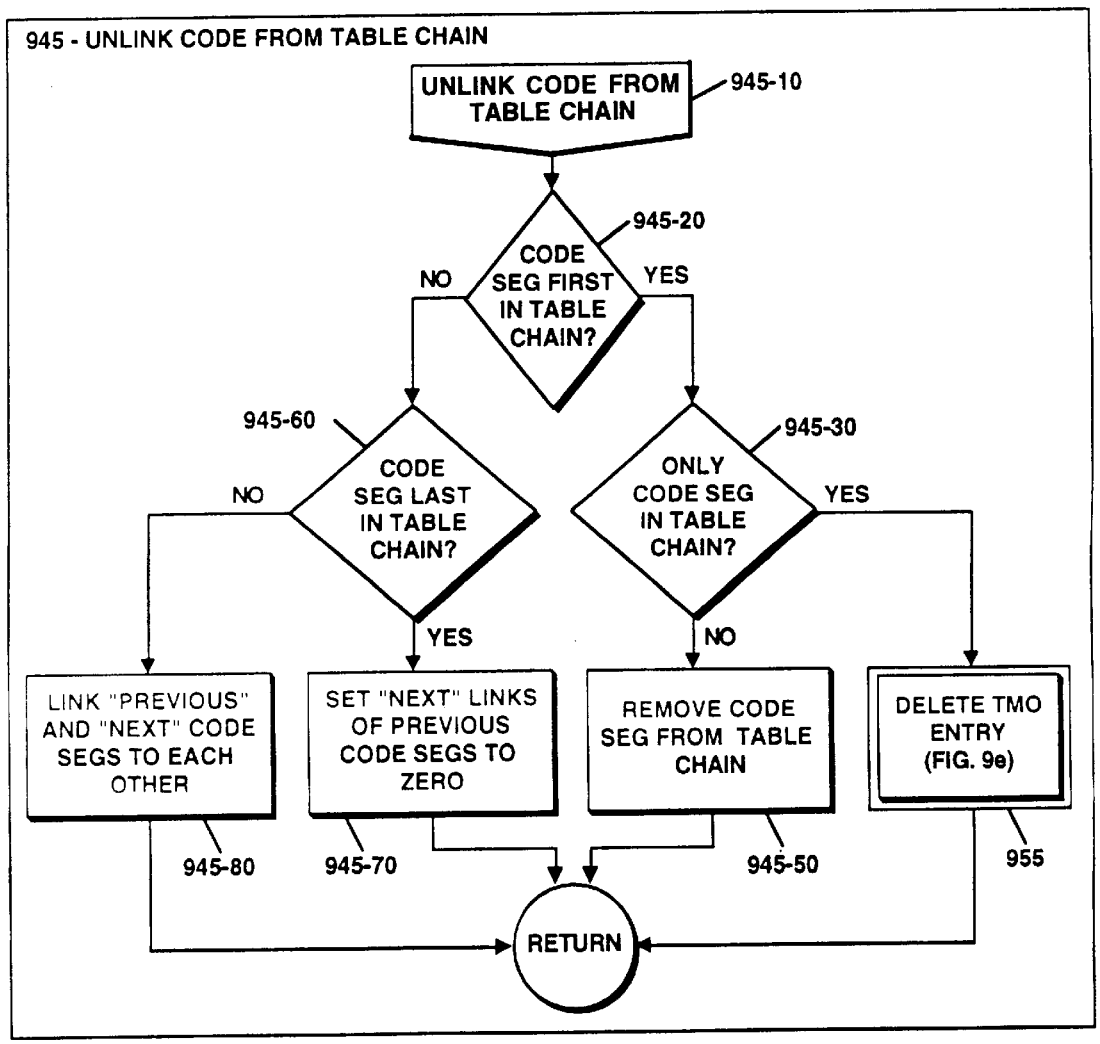

As indicated above, the more detailed operational flow of the OCM component 204-10, in particular, the flow at the list linkage level is described in more detail in FIGS. 9*a* through 9*g*. Briefly, as indicated above, FIG. 9*a* illustrates the operational flow used to find a TMO entry in a TMO list. FIG. 9*b* illustrates the operational flow sequence for linking code into a table chain. FIG. 9*c* illustrates the operational flow for unlinking code from a table chain.

Figures 9D, 9E, 9F:
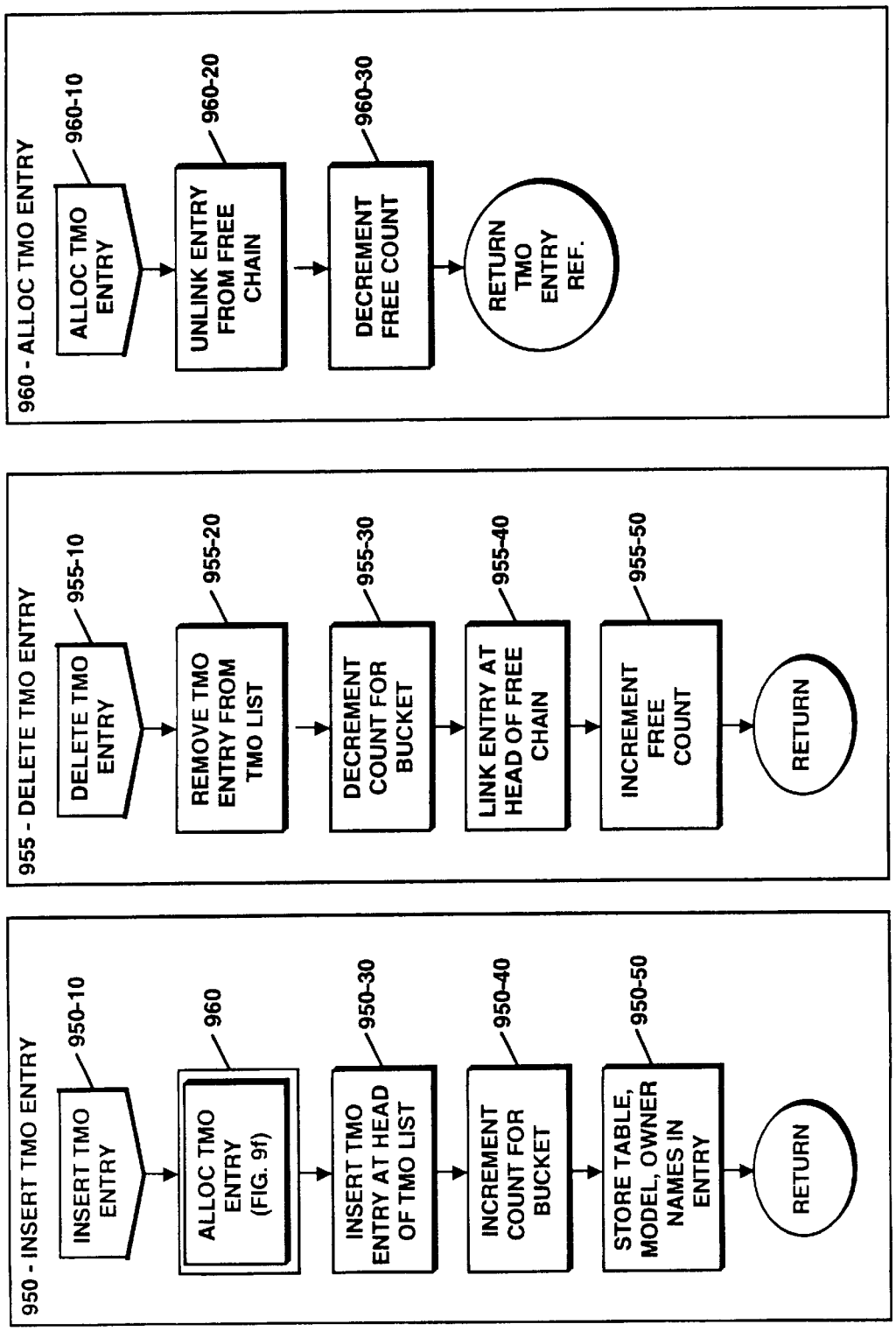
Figure 9G:
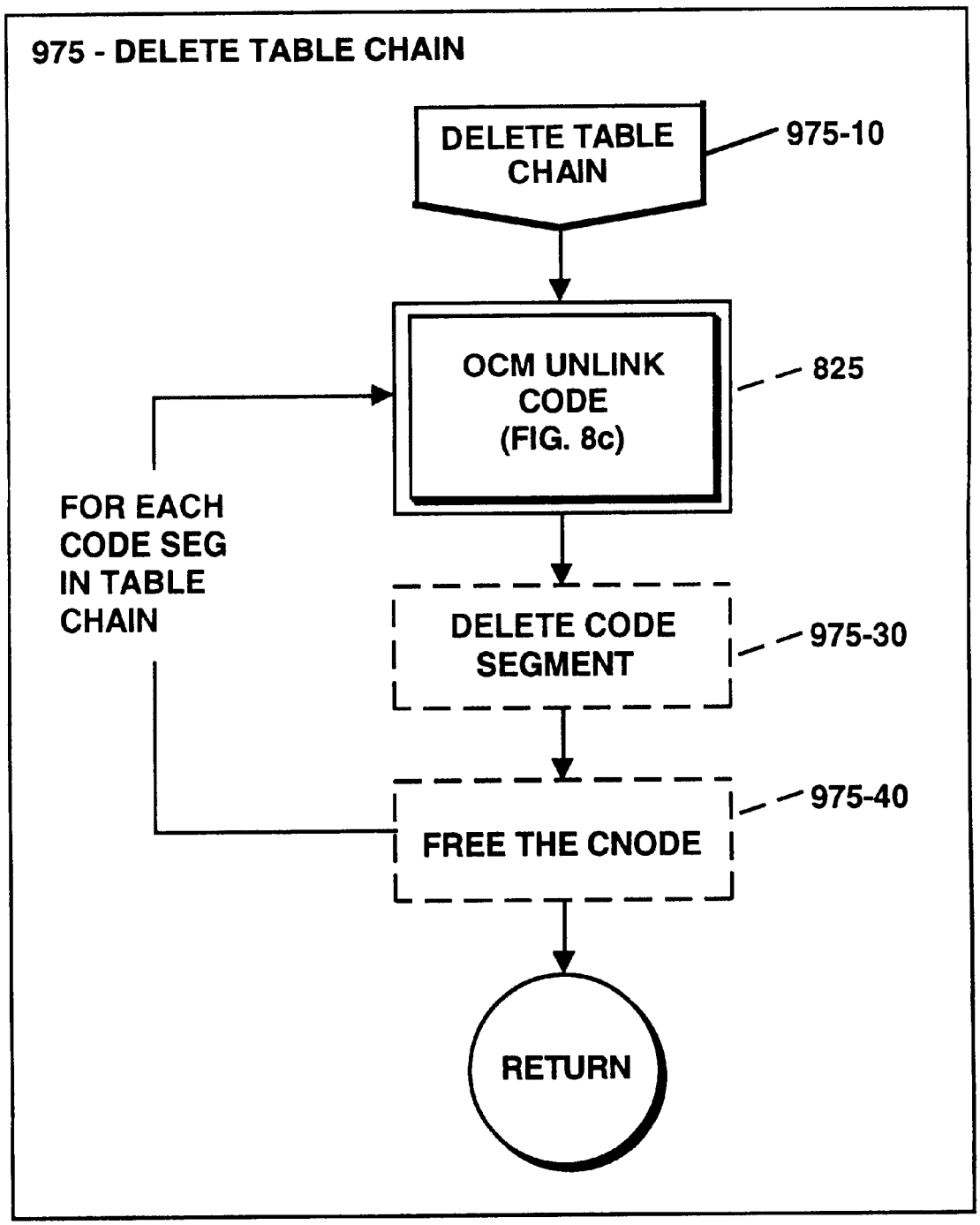

FIGS. 9*d* through 9*f* describe the operational flows for carrying out TMO entry operations. More specifically, FIG. 9*d* illustrates the operational flow for inserting a TMO entry into a TMO list. FIG. 9*e* illustrates the operational flow for deleting a TMO entry from a TMO list. FIG. 9*f* illustrates the operational flow for allocating a TMO entry that will be used for insertion into a TMO list. Lastly, FIG. 9*g* illustrates the operational flow for deleting a table chain. Since the lower level flow in these figures is quite detailed, the manner of carrying out the operations depicted will be obvious to those skilled in the art. Hence, it is unnecessary to provide any additional description relative to these operations.

From the above, it seen how the OCM component of the present invention is able to enhance the operation of a central cache system.

While the present invention was described relative to processing SQL statements, it will be obvious to those skilled in the art that the OCM component of the present invention may be used in conjunction with other languages, code, etc.

APPENDIX

I. Glossary

GLOSSARY

The terms used in the field of the present invention have the following meanings.

access method The way in which the RDBMS accesses relational data, using hash, indexed, or scan access.

access plan—The RDBMS Optimizer's plan for executing an SQL statement, including the type of access to each table, order of access, whether any sorts or joins are performed, and related information.

administrator—An individual who carries out tasks such as creating databases and/or monitoring the use and performance of those databases.

application—A program or set of programs that performs a specific task, such as entering orders and updating inventory records.

application programmer (application developer)—An individual who participates in the design, implementation, and/or testing of applications, including end-user facilities.

attribute—A descriptive characteristic of an entity, such as name, order number, item quantity, and so on. A characteristic such as UNIQUE or NOT NULL that can be applied to a column or other entity.

Buffer Manager—The software that manages buffer pools.

buffer pool—Main memory that is reserved for the buffering requirements of one or more table spaces, tables, or indexes.

CALC access—One of the methods of accessing relational tables or DM-IV databases that are accessible from the RDBMS. A synonym for hash access in the case of host-relational tables.

Cartesian product—The result of processing an SQL statement that references multiple tables but has no WHERE clause. Every row of each table is concatenated with every row of every other table. This operation can use excessive resources.

Central SQL Cache—Configured memory space in which code segments generated by the RDBMS are stored for reuse if the same SQL statement is executed again by any process that has been associated with this same Central SQL Cache. The use of one or more Central SQL Caches is optional and under Administrator control.

code generation—The RDBMS process that generates executable code for a specific SQL statement instead of executing that statement interpretively.

code segment—The code generated by the RDBMS for a specific SQL statement. Each code segment is stored in the Cache for reuse if the same SQL statement is executed again by the same process in the case of Process-Local SQL Cache, or by another process in the case of Central Cache.

column—The vertical component of a table. A column contains information about one of the attributes of an entity. The relational equivalent of a field.

concurrency control—The management of file accesses by processes operating concurrently, with the goal of ensuring that no process interferes with any other process and that the integrity of the data accessed in common is maintained.

concurrency level—The number of processes that concurrently access the same data.

concurrent access—Two or more processes accessing the same data table or partition at the same time.

Control Interval (CI)—The physical space increment used to store data in RDBMS files, processed as a unit. Synonymous with page. In a hash table, a CI is called a hash bucket.

cursor—A mechanism designed to allow multi-row results returned by RDBMS to be processed a row at a time in COBOL or Virtual C programs.

data type—A definition of how the data in a column is stored and managed. Commonly used data types include CHARACTER, NUMERIC, and FLOAT.

database—A collection of data that has meaning to an organization or to an individual and that is managed as a unit.

Database Management System (DBMS)—A set of software that controls the creation, organization, and modification of one or more databases, and provides access to the stored data.

Data Definition Language (DDL)—Statements used to define and modify the entities, attributes, and relationships that make up a database. DDL statements in RDBMS include CREATE MODEL, CREATE TABLE, CREATE INDEX, and others.

data independence—A property of an application that allows it to operate unchanged when the definition of the database is changed. Complete data independence is impossible to obtain, but good programming practices can be used to achieve a reasonable degree of data independence.

Data Manipulation Language (DML)—Statements used to access data and potentially to change data content. DML statements in RDBMS include SELECT and UPDATE.

decision support—A mode of access to data designed to support users' need for data on which to base business or organizational decisions. Interactive, usually readonly, and usually with less stringent response requirements than production transaction processing.

dynamic SQL—SQL that is not hard-coded into an application program, but instead is defined dynamically using any of several possible methods: e.g., keyed in by a user, read in from a file, etc.

entity—A fundamental part of an enterprise, such as a person, an order, an item, and so on. Entities are often fundamental elements in a database.

generated code—A reusable set of machine instructions that are produced to execute a particular SQL statement.

hash access—One of the methods of accessing relational tables. Hash access operates on a hash key value, using a hash function, to generate a bucket number in which the associated data row is stored. The same hash function is used to retrieve the data row. Potentially the fastest method of access to relational data when the exact value of the hash key is known. Sometimes called CALC access.

hash bucket—The increment of storage used to contain data rows in a hash table. A hash bucket is equivalent to a control interval (CI).

hash function—The formula used to generate a hash bucket number from a hash key value, in order to decide where to store a data row, and later how to retrieve the row.

hash key—The column(s) whose values are used as input to the hash function to determine where to store the associated data row, and later how to retrieve the row.

hash table—A relational table organized in terms of hash buckets. Data rows are stored in the hash buckets using the hash function.

host variable—Storage allocated by a language processor such as COBOL-85 for use in passing variable information to or from an SQL statement.

host-relational files—Files managed by RAM/RFM and maintained on mass-storage devices attached to a system. The term is used to distinguish these files from relational files maintained by a Relational Data Base Computer linked to a system.

index—A set of pointers to data in relational tables, used to improve the speed of access to the data. The index is maintained in the form of a balanced B-tree structure.

index key—The column(s) whose values are included in the index for the table.

indexed access—The access mode in which RDBMS uses one or more indexes to retrieve the requested information. In some cases, RDBMS can retrieve the requested information directly from the index, without accessing the data table.

integrity—The property of being logically correct and consistent. In some cases, this term also implies denying access to unauthorized users and processes.

join—An operation that combines two or more tables based on some common attribute value(s) that the tables share. There is no specific JOIN statement or operator visible to an application developer or user. Any SELECT statement that references multiple tables implies that a join is required.

literal-A constant value that can be included in an SQL statement and used to compare against values that exist in the table to be accessed.

maintenance—In this context, the actions required when an index or table becomes physically disorganized so that index information or table data may be stored in multiple locations, with a negative impact on performance. Maintenance typically involves dropping and re-creating indexes and dumping and repopulating tables.

model-An RDBMS (relational) term that is equivalent to database. A model can include one or more tables.

multi-table tablespace—An unpartitioned tablespace that contains multiple tables. The tablespace is a single physical file. Contrast this with a partitioned tablespace.

normalization—A process in which data redundancy is eliminated from the design of data tables. There are various forms of normalization, ranging from first normal form to fifth normal form. Normalization minimizes the risk that data anomalies will occur.

Operational Directory Interface (ODI)—A data definition directory used by RDBMS.

Optimizer—The software component of RDBMS that analyzes each SQL statement and defines the access plan that will produce the optimum performance for the execution of that statement.

owner—An identifier representing the identity of the user that created a model, table, index, or other object within a model. The owner has the most privilege with respect to accessing and updating table layout and content, and the establishment and modification of access permissions for other users of the model and tables. Every table has an owner associated with it that represents the user that created it.

page—The physical space increment used to store data in RDBMS files, processed as a unit. Synonymous with control interval (CI).

parallel batch execution—A technique in which one large batch program is partitioned into multiple programs that can run in parallel to shorten the elapsed time required for execution.

partitioned tablespace—A tablespace that contains a single table that is too large to process efficiently as one entity. The tablespace and the table are separated into partitions that can be placed on different mass storage devices. Each partition can be processed independently.

performance—The ability of applications and interactive facilities to meet users' requirements for speed of response in interactive applications or speed of throughput in production batch and/or transaction processing applications.

primary index (key)—In some implementations, but not in RDBMS, an index (and associated key) that uniquely identifies each row of a table.

process—An execution unit, which may or may not be identical to an application program. (An application program may involve multiple processes.)

Process-Local SQL Cache—The configured memory space in which code segments generated by RDBMS are stored for reuse if the same SQL statement is executed again by the same process.

query—Used to refer to any SQL statement that causes an access to relational tables, regardless of whether the access is followed by a modification.

Relational Access Manager (RAM)—The part of the RDBMS software that manages relational tables.

Relational database—A database that is defined in terms of entities, attributes, and relationships, and that observes the concepts defined originally by E. F. Codd.

Relational Database Management System (RDBMS)—The INTEREL Software that manages relational databases.

Relational File Manager (RFM)—The part of the RDBMS software that accesses data from relational files, as directed by the Relational Access Manager (RAM).

relationship—An association of one or more entity types with one or more other entity types.

reorganization—A synonym for maintenance and/or restructuring.

response—The speed with which the system replies to a request during interactive processing.

restructuring—Changing the definitions of tables and/or indexes when the logical design of the database changes or the patterns of access to the data change. Restructuring typically follows the same procedure required during the initial design, definition, and population of a database. Restructuring is one form of maintenance.

result—The data obtained by executing a query. Results can be displayed on the user's screen or printed on a hard-copy device such as the system printer.

row—The horizontal component of a table. A row consists of a sequence of values, one for each column of the table.

scan access—The access mode in which RDBMS scans a table sequentially, row-by-row, to retrieve the requested information.

search condition—The specification of how to identify the desired data in the rows and columns retrieved when processing an SQL statement.

SELECT—An SQL statement that defines the information to be selected from one or more tables. Also a clause that includes the SELECT verb in an SQL statement.

set operators—Operators that are used to combine the results of two or more SELECT clauses into a single result. The set operators are INTER[SECT], MINUS, and UNION.

single-column index (key)—An index and key made up of only one column.

single-table tablespace—An unpartitioned tablespace that contains one table. The tablespace is a single physical file. Contrast this with multi-table tablespace and with partitioned tablespace.

SQL—Originally an acronym for Structured Query Language. Now the name of the language most commonly used to access relational databases.

SQL Cache—Configured memory space in which code segments generated by RDBMS are stored for reuse if the same SQL statement is executed again. There are two levels of SQL Cache, Process-Local SQL Cache and Central SQL Cache.

table—The relational component that corresponds to a file in non-relational technology. Tables have two forms: hash and non-hash.

tablespace—Physical space that is created explicitly to contain one or more tables in a relational database. If a tablespace is not created explicitly, the table is stored in space allocated by the system. Space allocated by the system is not called a tablespace.

tuning—The process of adjusting database definitions, application implementations, and/or system parameters to improve performance.

UNION—An SQL operator that combines the results of two SELECT clauses. UNION often is used to merge lists of values obtained from several tables. UNION is a set operator; other set operators are INTER and MINUS.

unpartitioned tablespace—A tablespace that contains either a single table or multiple tables. The latter case is called a multi-table tablespace. In both cases, the tablespace is a single physical file. Contrast this with partitioned tablespace.

user—An individual who accesses RDBMS databases by means of an application or interactive facility.

WHERE clause—The part of an SQL statement that defines the conditions (restrictions) for selecting data before grouping (if grouping is specified). These restrictions are referred to as search conditions.

workstation—When unqualified, the term workstation refers to any desktop or portable device used to access RDBMS facilities.

It will be appreciated that many changes may be made to the preferred embodiment of the present invention without departing from its teachings. For example, the present invention may be used in different types of data processing systems and in processing different types of queries. The present invention may also be used with other data item formats, etc.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A method of performing obsolete code management by an obsolete code management (OCM) component within a multicache system having a number of local caches located in a primary memory of a host system, each local cache being associated with a different one of a number of processes being run on the host system and at least one central cache located in a shared area of the primary memory, the central cache for storing copies of generated segments of code produced by the processes for executing data manipulation statements for use by other processes in processing logically equivalent statements, each data manipulation statement referencing a number of database entities, and for performing obsolete code management in response to other types of statements that alter the properties of the database entities, the method comprising the steps of:

(a) categorizing the host system executed operations included in each different type of statement that alters the properties of the database entities into two main categories, a first category wherein the statement designates an operation that will cause generated code segments to become obsolete and a second category wherein the statement specifies operations that will not cause generated code segments to become obsolete;

(b) including predefined calls to the OCM component as a function of step (a) in software code that processes operations that will cause code segments to become obsolete; and, (c) in response to each predefined call in step (b) received from the software code that processes operations that will cause code segments to become obsolete, the OCM component being operative to delete all obsolete code entries stored in the central cache referencing database entities affected by the statement being processed.

2. A method of performing obsolete code management within a multicache system having a plurality of components including a number of local caches located in a primary memory of a host system, each local cache being associated with one of a number of processes being run on the host system and at least one central cache component located in a shared area of the primary memory, the central cache component for storing copies of generated code segments produced by the processes for executing data manipulation statements for use by other processes in processing logically equivalent statements, each data manipulation statement referencing a number of database entities, and for performing obsolete code management in response to other types of statements that alter the properties of the database entities, the method comprising the steps of:

(a) receiving calls from different ones of the plurality of the components by an obsolete code management (OCM) component;

(b) invoking a first type of function of the OCM component in response to calls received from the central cache component for reporting changes in central cache content occurring during the processing of data manipulation statements, the first function causing either addition or removal of code entries contained in the central cache that reference database entities being affected as a result of processing the statements; and, (c) invoking a second type of function of the OCM component in response to calls received from other components involved in the processing of the other types of statements, the second function deleting all obsolete code entries referencing database entities affected by the type of statement being processed.

3. The method of claim 2 wherein the first type of function includes an OCM link code operation and an OCM unlink code operation and wherein the second type of function includes a delete obsolete code operation.

4. The method of claim 2 wherein the other types of statements include: alter table; drop table; drop tablespace; drop model; drop index; create index; grant and revoke.

5. The method of claim 2 wherein step (b) further includes the steps of:

(d) maintaining a set of control structures containing a number of entries defining the database entities being utilized by each segment of code stored in central cache;

(e) searching entries in the set of control structures for determining the location of those segments of code that reference an affected database object; and, (f) deleting the segments of code identified by the set of control structures.

6. The method of claim 5 wherein the set of control structures include a set of TMO entries representing a particular combination of table, model and owner (TMO) names wherein there is only one TMO entry for each unique database object that is referenced by all of the segments of code stored in central cache and a TMO bucket structure for providing efficient access to TMO entries.

7. The method of claim 6 wherein each TMO entry includes a name area containing fields for storing table, model and owner name values, the values being stored in a predetermined order for maximizing efficient search comparisons.

8. The method of claim 6 wherein each segment of code includes a header area for storing linkage information used for identifying each database object referenced by the corresponding segment of code facilitating deletion of obsolete code entities.

9. Obsolete code management (OCM) software stored on a storage medium for eliminating obsolete centrally cached code segments generated for executing data manipulation statements for use by other processes in processing logically equivalent statements, each data manipulation statement referencing a number of database entities, and for eliminating obsolete code segments resulting from other types of statements that alter the properties of the database entities, the OCM software comprising:

(a) software code that processes operations that will cause code segments to become obsolete containing predefined calls resulting from categorizing the operations included in each different type of statement to be executed into two main categories, a first category wherein the statement designates an operation that will cause generated code segments to become obsolete and a second category wherein the statement specifies operations that will not cause the generated code segments to become obsolete; and, (b) OCM code that is responsive to each predefined call from the software code that processes operations that will cause code segments to become obsolete for deleting all centrally cached obsolete code entries referencing database entities affected by the statement being processed.

10. The method of claim 9 wherein the first category includes the following types of statements: alter table; drop table; drop tablespace; drop model; drop index; create index; grant and revoke.

11. The method of claim 9 wherein the second category includes the following types of statements: create table and create tablespace.

12. A system for performing obsolete code management within a multicache system having a plurality of components including a number of local caches located in a primary memory of a host system, each local cache being associated with a different one of a number of processes being run on the host system and at least one central cache component located in a shared area of the primary memory, the central cache component for storing copies of generated code segments produced by the processes for executing data manipulation statements for use by other processes in processing logically equivalent statements, each data manipulation statement referencing a number of database entities, and for performing obsolete code management in response to other types of statements that alter the properties of the database entities, the system comprising:

(a) means for receiving calls from different ones of the plurality of the components by an obsolete code management (OCM) component;

(b) first type of function means responsive to calls received from the central cache component reporting changes in central cache content occurring during the processing of data manipulation statements, the first type of function means causing removal of code entries contained in the central cache that reference database entities being affected as a result of processing the statements; and, (c) second type of function means responsive to calls received from other components involved in the processing of the other types of statements, the second type of function means deleting all obsolete code entries referencing data entities affected by the type of statement being processed.

13. The system of claim 12 wherein the first type of function means includes components for performing an OCM link code operation and an OCM unlink code operation and wherein the second type of function means includes components for performing a delete obsolete code operation.

14. The system of claim 12 wherein the other types of statements include: alter table; drop table; drop tablespace; drop model; drop index; create index; grant and revoke.

15. The system of claim 12 wherein the system further includes:

(d) means for maintaining a set of control structures containing a number of entries defining the database entities being utilized by each segment of code stored in central cache;

(e) means for searching entries in the set of control structures for determining the location of those segments of code that reference an affected database entity; and, (f) means for deleting the segments of code identified by the set of control structures.

16. The method of claim 5 wherein the set of control structures include a set of TMO entries representing a particular combination of table, model and owner (TMO) names wherein there is only one TMO entry for each unique database object that is referenced by all of the segments of code stored in central cache and a TMO bucket structure for providing efficient access to TMO entries.

17. The system of claim 16 wherein each TMO entry includes a name area containing fields for storing table, model and owner name values, the values being stored in a predetermined order for maximizing efficient search comparisons.

18. The system of claim 16 wherein each segment of code includes a header area for storing linkage information used for identifying each database entity referenced by the corresponding segment of code facilitating deletion of obsolete code entities.

* * * * *